United States Patent
Han et al.

(10) Patent No.: US 9,465,497 B2
(45) Date of Patent: Oct. 11, 2016

(54) TOUCH SENSING SYSTEM

(71) Applicant: LG Display Co., Ltd., Seoul (KR)

(72) Inventors: Sungsu Han, Gyeonggi-do (KR); Seongkyu Kang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 92 days.

(21) Appl. No.: 14/478,196

(22) Filed: Sep. 5, 2014

(65) Prior Publication Data

US 2015/0185913 A1  Jul. 2, 2015

(30) Foreign Application Priority Data

Dec. 31, 2013  (KR) .................. 10-2013-0168601

(51) Int. Cl.
*G06F 3/044* (2006.01)
*G06F 3/041* (2006.01)
*G06F 3/01* (2006.01)

(52) U.S. Cl.
CPC .............. *G06F 3/044* (2013.01); *G06F 3/0418* (2013.01)

(58) Field of Classification Search
CPC ......... G06F 3/044; G06F 3/041; G06F 3/011
See application file for complete search history.

(56) References Cited

U.S. PATENT DOCUMENTS

| 7,861,188 | B2* | 12/2010 | Josephsoon | G06F 3/011 345/156 |
|---|---|---|---|---|
| 8,350,824 | B2 | 1/2013 | Hung et al. | |
| 2013/0307813 | A1* | 11/2013 | Hanssen | G06F 3/044 345/174 |
| 2014/0043252 | A1* | 2/2014 | Kim | G06F 3/041 345/173 |
| 2014/0062918 | A1* | 3/2014 | Chen | G06F 3/0416 345/173 |
| 2014/0062951 | A1* | 3/2014 | Chang | G06F 3/044 345/174 |
| 2014/0125628 | A1* | 5/2014 | Yoshida | G06F 3/044 345/174 |
| 2014/0125629 | A1* | 5/2014 | Miyamoto | G06F 3/044 345/174 |
| 2014/0132541 | A1* | 5/2014 | Miyamoto | G06F 3/044 345/173 |

* cited by examiner

*Primary Examiner* — Lin Li
(74) *Attorney, Agent, or Firm* — Morgan, Lewis & Bockius LLP

(57) ABSTRACT

A touch sensing system includes a plurality of touch sensors, sensing lines connected to the touch sensors, a touch sensing integrated circuit (IC) sensing a touch input using signals received through a plurality of receiving channels, a plurality of differential amplifiers which are formed between the sensing lines and the receiving channels of the touch sensing IC and amplify a difference between touch sensor signals received through adjacent sensing lines, and a multiplexer which connects the adjacent sensing lines to input terminals of each differential amplifier in a forward sensing mode and switches the adjacent sensing lines connected to the input terminals of each differential amplifier in a reverse sensing mode.

17 Claims, 14 Drawing Sheets

FIG. 9
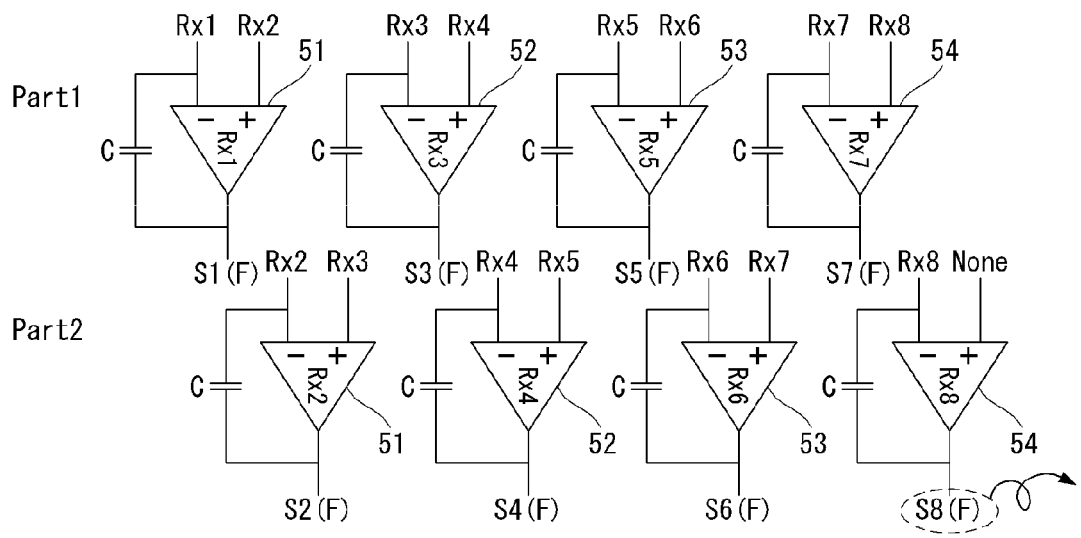
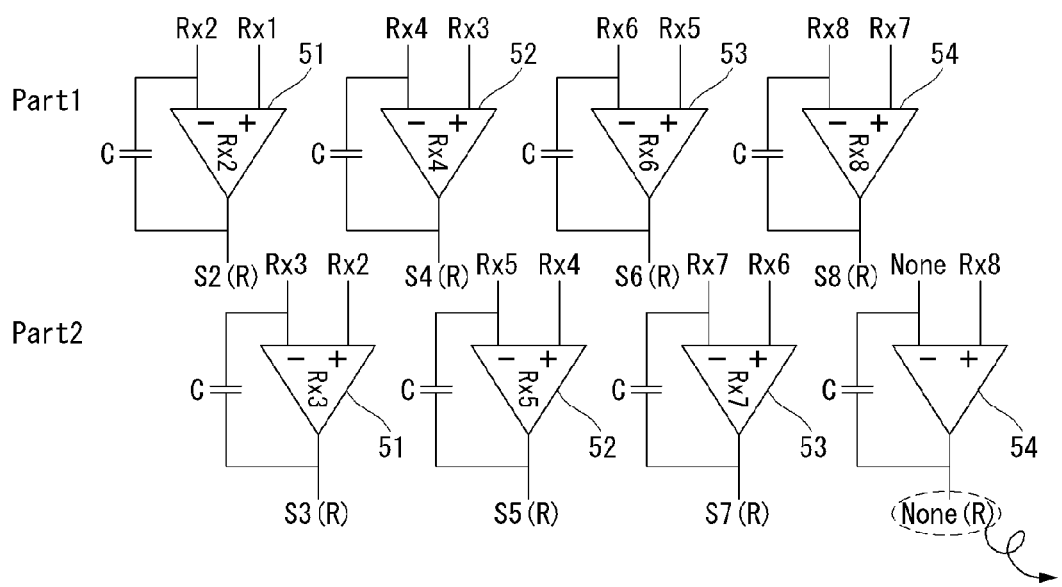

FIG. 10
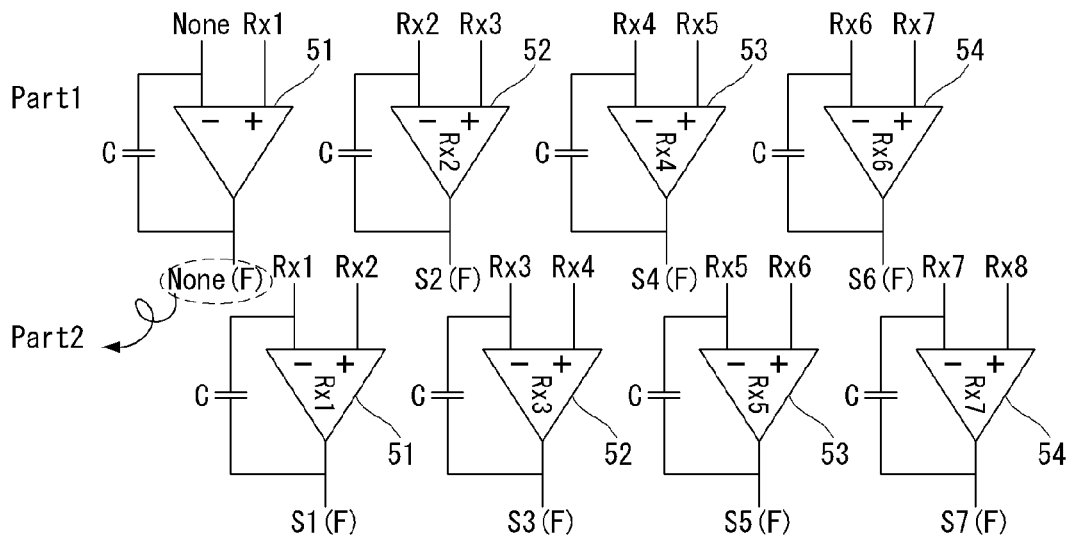
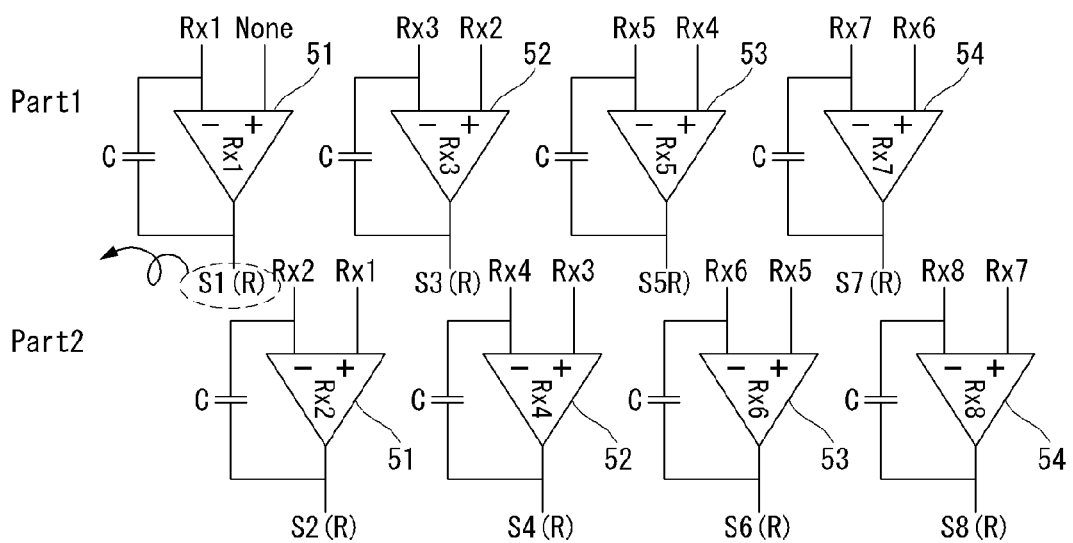

TOUCH SENSING SYSTEM

This application claims the benefit of Korean Patent Application No. 10-2013-0168601 filed on Dec. 31, 2013, the entire contents of which is incorporated herein by reference for all purposes as if fully set forth herein.

BACKGROUND OF THE INVENTION

1. Field of the Invention

The present invention relates to a touch sensing system.

2. Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

The touch UI has been indispensably adopted in portable information appliances. The touch UI is implemented through a method for forming a touch screen on the screen of a display device.

As shown in FIG. 1, a mutual capacitive touch screen includes Tx lines Tx1 to Tx4, Rx lines Rx1 to Rx4 perpendicular to the Tx lines Tx1 to Tx4, and touch sensors formed between the Tx lines Tx1 to Tx4 and the Rx lines Rx1 to Rx4. Each touch sensor includes a mutual capacitance Cm. A sensing circuit supplies a driving signal to the Tx lines Tx1 to Tx4 and receives a touch sensor signal synchronized with the driving signal through the Rx lines Rx1 to Rx4. The sensing circuit senses a change amount of charges of the touch sensor and analyzes the change amount of charges. Hence, the sensing circuit decides whether or not there is a touch input and finds out a position of the touch input when there is the touch input. The sensing circuit may be integrated into touch sensing integrated circuits (ICs) and may be connected to the Tx lines Tx1 to Tx4 and the Rx lines Rx1 to Rx4.

Differential amplifiers 11 to 14 may be connected to the Rx lines Rx1 to Rx4. The sensing circuit may receive a signal amplified by the differential amplifiers 11 to 14, each of which is connected to the two adjacent Rx lines. An output terminal of each of the differential amplifiers 11 to 14 is connected to an inverting input terminal (−) via a capacitor C. Each of the differential amplifiers 11 to 14 amplifies a difference between an ith sensor signal input to the inverting input terminal (−) and an (i+1)th sensor signal input to a non-inverting input terminal (+) and outputs ith sensor signals S1 to S4, where 'i' is a positive integer. As shown in FIG. 2, the differential amplifiers 11 to 14 amplify a difference between the signals received through the adjacent Rx lines and further increase signal components than a noise, thereby improving a signal-to-noise ratio (SNR).

In a method for obtaining the sensor signal through the differential amplifiers 11 to 14, (N−1) sensor signals may be obtained when N Rx lines are used, where N is a positive integer equal to or greater than 2. There is a method for applying a virtual dummy signal to a non-inverting input terminal of the differential amplifier connected to a first receiving channel (hereinafter referred to as "Rx channel") or a last Rx channel of the sensing circuit, so as to obtain the N sensor signals. However, the method has the problem, in which the signal-to-noise ratio of some sensor signals is reduced. In particular, the signal-to-noise ratio of one of edge Rx channels (i.e., the first Rx channel and the last Rx channel) positioned at both ends among the Rx channels of the sensing circuit is reduced.

In an example shown in FIG. 1, a dummy signal D0 is input to the non-inverting input terminal (+) of the fourth differential amplifier 14. The fourth differential amplifier 14 outputs a signal obtained by amplifying a difference between a fourth sensor signal and the dummy signal D0 as a fourth sensor signal. The dummy signal D0 does not have a noise, unlike the sensor signal. Thus, when the difference between the fourth sensor signal and the dummy signal D0 input to the fourth differential amplifier 14 is amplified, the noise is amplified. As a result, an improvement effect of the signal-to-noise ratio of the signal output from the fourth differential amplifier 14 is less than the other differential amplifiers 11 to 13.

When the size and a resolution of the touch screen increase, the number of transmitting channels (hereinafter referred to as "Tx channels") and the number of Rx channels of the touch screen increase. Thus, when the size and the resolution of the touch screen increase, two or more ICs need to be connected to the touch screen.

U.S. Pat. No. 8,350,824 B2 disclosed a method for connecting two ICs to a large-sized touch screen and obtaining sensor data (hereinafter referred to as "boundary data") at a boundary between the two ICs. U.S. Pat. No. 8,350,824 B2 proposed a method for low-pass filtering the boundary data between the ICs and data adjacent to the boundary data and generating the boundary data using a low-pass filtering value as an average value, so as to obtain the boundary data. However, such a sensing method has to compare the data adjacent to the boundary data and calculate the average value of the adjacent data, so as to obtain the boundary data. Hence, a processing amount of data increases, and data processing time increases. Further, when there is a large output deviation between the ICs, the accuracy of data may be reduced.

SUMMARY OF THE INVENTION

Accordingly, the present invention is directed to a touch sensing system that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch sensing system comprises a plurality of touch sensors, sensing lines connected to the touch sensors, a touch sensing integrated circuit (IC) configured to sense a touch input using signals received through a plurality of receiving channels, a plurality of differential amplifiers formed between the sensing lines and the receiving channels of the touch sensing IC, each of the plurality of differential amplifiers configured to amplify a difference between touch sensor signals received through adjacent sensing lines, and a multiplexer configured to connect the adjacent sensing lines to input terminals of each differential amplifier in a forward sensing mode and switch the adjacent sensing lines connected to the input terminals of each differential amplifier in a reverse sensing mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 9 shows changes in input and output of differential amplifiers shown in FIG. 8 in a forward sensing mode and a reverse sensing mode;

FIG. 10 is a plane view showing a connection structure between a touch screen and differential amplifiers according to a fourth embodiment of the invention;

DETAILED DESCRIPTION OF THE ILLUSTRATED EMBODIMENTS

Figure 1:
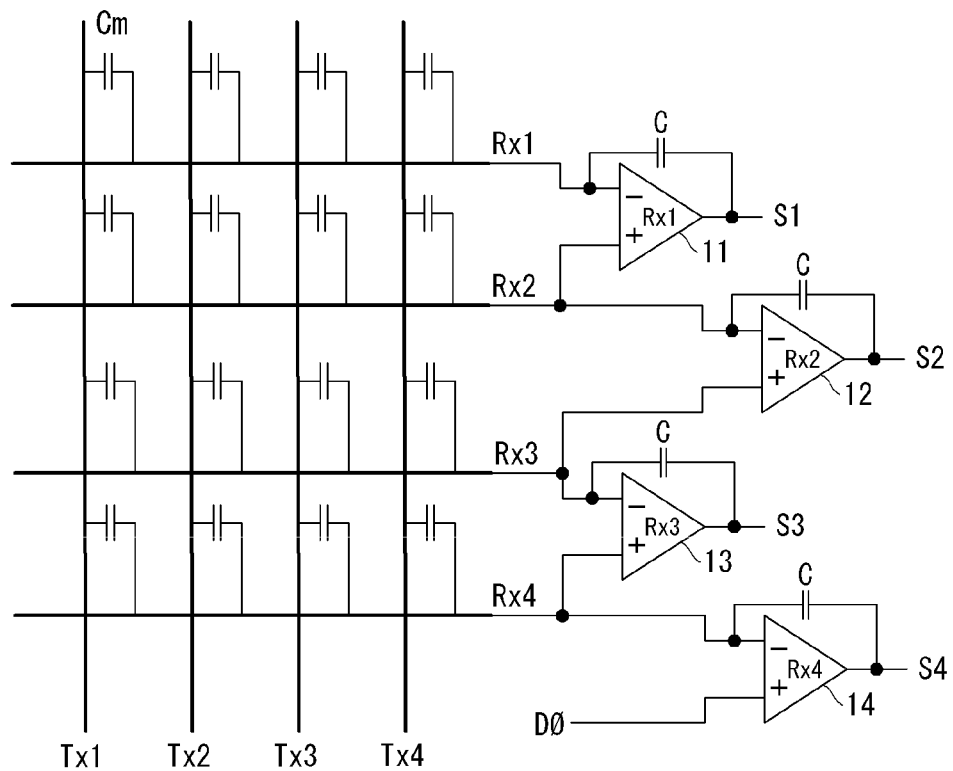
FIG. 1 is a circuit diagram showing differential amplifiers connected to adjacent Rx lines.
Figure 2:
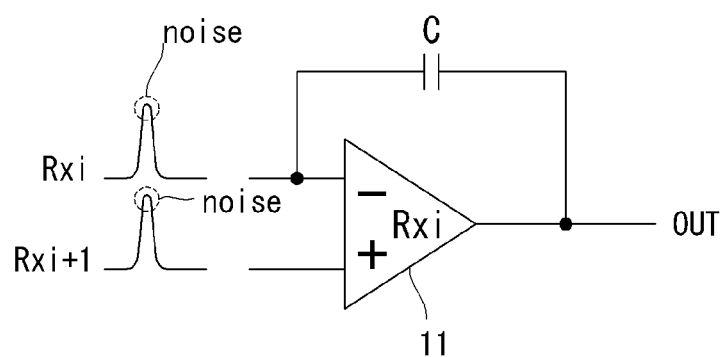
FIG. 2 shows an improvement effect of a signal-to-noise ratio using a differential amplifier.
Figure 3:
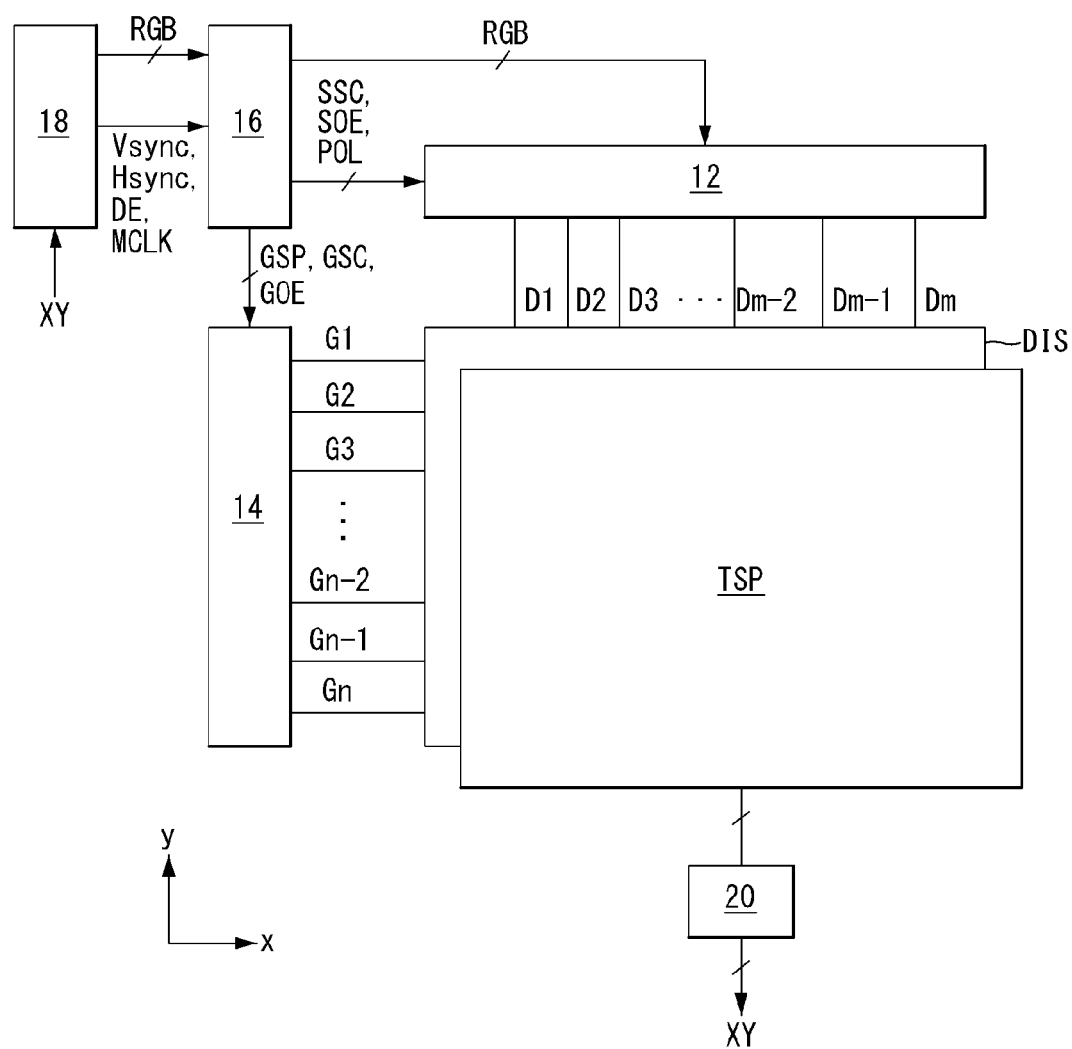
FIG. 3 is a block diagram of a touch sensing system according to an exemplary embodiment of the invention.

A display device according to an exemplary embodiment of the invention may be implemented based on a flat panel display, such as a liquid crystal display (LCD), a field emission display (FED), a plasma display panel (PDP), an organic light emitting display, and an electrophoresis display (EPD). In the following description, the embodiment of the invention will be described using the liquid crystal display as an example of the flat panel display. Other flat panel displays may be used.

A touch sensing system according to an embodiment of the invention may be implemented as a capacitive touch screen which senses a touch input through a plurality of capacitive sensors. The capacitive touch screen includes a plurality of touch sensors. Each touch sensor has a capacitance. The capacitance may be divided into a self capacitance and a mutual capacitance. The self capacitance is formed along a conductor line of a single layer formed in one direction. The mutual capacitance is formed between two conductor lines perpendicular to each other. In the following description, the embodiment of the invention will be described using the mutual capacitive touch screen as an example of the capacitive touch screen. Other types of capacitive touch screens may be used.

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

As shown in FIGS. 3 to 7, a touch sensing system according to the embodiment of the invention includes a touch screen TSP and a touch sensing integrated circuit (IC) 20.

The touch screen TSP includes Tx lines Tx1 to Tx5, Rx lines Rx1 to Rx8 crossing the Tx lines Tx1 to Tx5, and touch sensors Cm respectively formed at crossings of the Tx lines Tx1 to Tx5 and the Rx lines Rx1 to Rx8. The Tx lines Tx1 to Tx5 are driving signal lines which apply a driving signal to each of the touch sensors Cm and supply charges to the touch sensors Cm. The Rx lines Rx1 to Rx8 are sensing lines which are connected to the touch sensors Cm and supply charges of the touch sensors Cm to the touch sensing IC 20. The Tx lines Tx1 to Tx5 and the Rx lines Rx1 to Rx8 cross each other with an insulating layer (or a dielectric layer) interposed therebetween. The Rx lines Rx1 to Rx8 may be divided at a position crossing the Tx lines Tx1 to Tx5, so that the Tx lines Tx1 to Tx5 and the Rx lines Rx1 to Rx8 are not short-circuited at the crossings of the Tx lines Tx1 to Tx5 and the Rx lines Rx1 to Rx8. Divided portions of the Rx lines may be connected through a bridge pattern penetrated through the insulating layer. The bridge pattern crosses the Tx lines with the insulating layer interposed therebetween, and thus the Tx lines and the Rx lines are not short-circuited. A portion of the Tx line is removed at the crossings of the Tx lines and the Rx lines, and the divided portions of the Tx line may be connected to each other through a bridge pattern penetrated through the insulating layer.

The touch screen TSP may be attached on an upper polarizing plate of a display panel DIS or may be formed between the upper polarizing plate and an upper substrate of the display panel DIS. The touch sensors Cm of the touch screen TSP may be formed on a lower substrate of the display panel DIS along with a pixel array of the display panel DIS and may be embedded in the display panel DIS in an in-cell type.

The touch sensing IC 20 senses a change amount of charges of the touch sensors before and after a touch operation and decides whether or not there is a touch input of a conductive material, such as a finger. The touch sensing IC 20 finds out a position of the touch input when there is the touch input. The touch sensing IC 20 is connected to the Tx lines Tx1 to Tx5 and the Rx lines Rx1 to Rx8. The touch sensing IC 20 supplies a driving signal to the Tx lines Tx1 to Tx5 and receives a touch sensor signal synchronized with the driving signal through the Rx lines Rx1 to Rx8.

Figure 11:
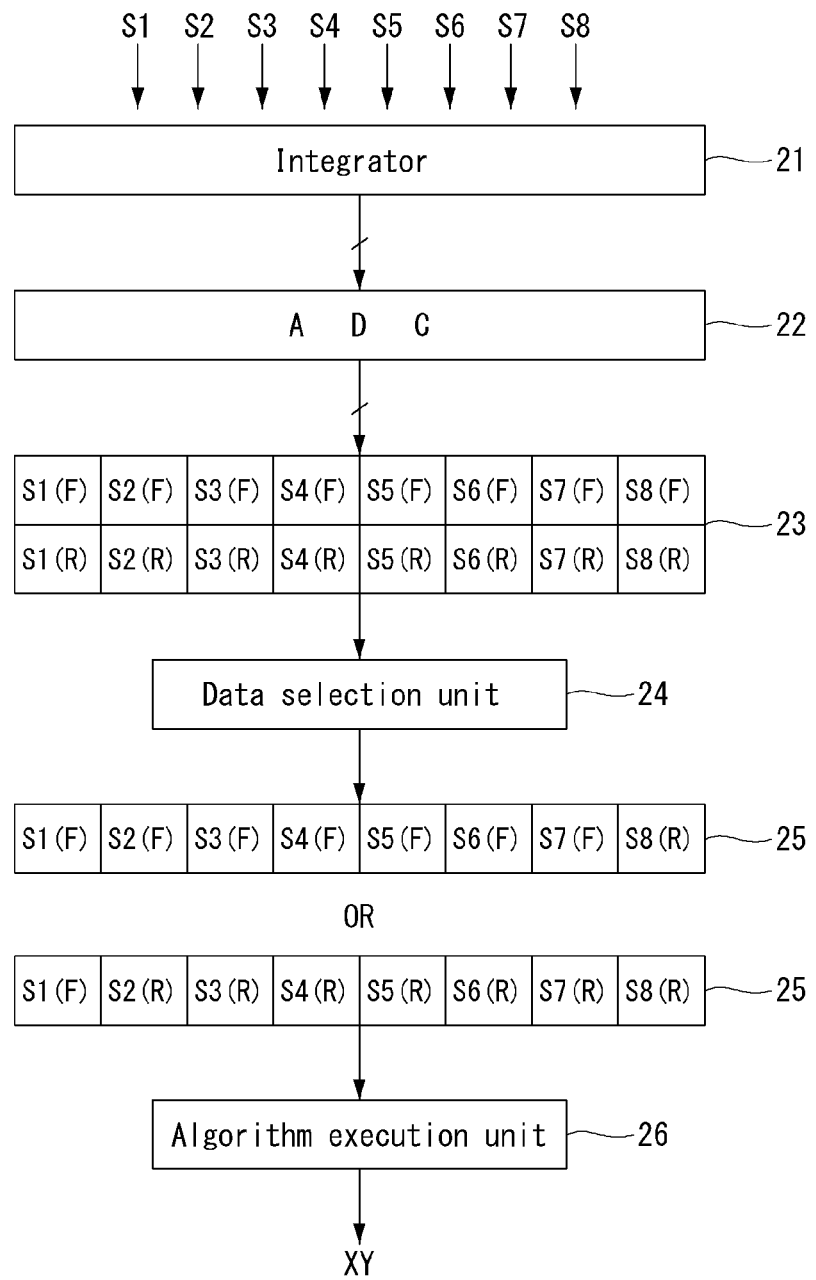
FIG. 11 shows in detail a touch sensing IC.

As shown in FIG. 11, the touch sensing IC 20 includes an integrator 21 connected to differential amplifiers, an analog-to-digital converter (ADC) 22, a memory 23, a data selection unit 24, a buffer memory 25, and an algorithm execution unit 26. A sample & hold circuit, which samples the touch sensor signal output from the differential amplifiers and supplies the sampled touch sensor signal to the integrator 21, is disposed between the differential amplifiers and the integrator 21. The touch sensing IC 20 further includes a driving signal generator supplying the driving signal to the Tx lines Tx1 to Tx5. The driving signal generator is omitted in FIG. 11.

The touch sensing IC 20 supplies the driving signal to the Tx lines Tx1 to Tx5, receives the touch sensor signal synchronized with the driving signal through the Rx lines Rx1 to Rx8, samples the touch sensor signal, and senses a change amount of charges of each touch sensor. The driving signal supplied to the touch sensors Cm may be generated in various forms, such as pulses of a square wave, pulses of a sine wave, and pulses of a triangle wave. As shown in FIGS. 10 and 11, the driving signal may be supplied to each Tx line two or more times. In this instance, each touch sensor signal may be accumulated in the integrator 21 two or more times. When charges of the touch sensor Cm are accumulated in the integrator 21 several times, the change amount of charges of the touch sensor Cm increases as the number of accumulation operations increases. Therefore, a signal-to-noise ratio (SNR) increases.

The touch sensing IC 20 converts the change amount of charges of the touch sensors before and after the touch operation into touch raw data using the ADC 22 and temporarily stores the touch raw data in the memory 23, so as to compare the change amount of charges of the touch sensors with a predetermined threshold value. The algorithm execution unit 26 of the touch sensing IC 20 compares the touch raw data with the predetermined threshold value and decides touch raw data greater than the predetermined threshold value as a touch sensor signal of a touch input position. A touch report output from the touch sensing IC 20 includes coordinate information XY of each of touch inputs and is transmitted to a host system 18. The data selection unit 24 and the buffer memory 25 shown in FIG. 11 removes touch raw data of a sensing result having the bad signal-to-noise ratio among forward sensing results and reverse sensing results, properly combines the remaining sensing results as many as the number of Rx channels, and supplies the combined results to the algorithm execution unit 26.

Figure 4:
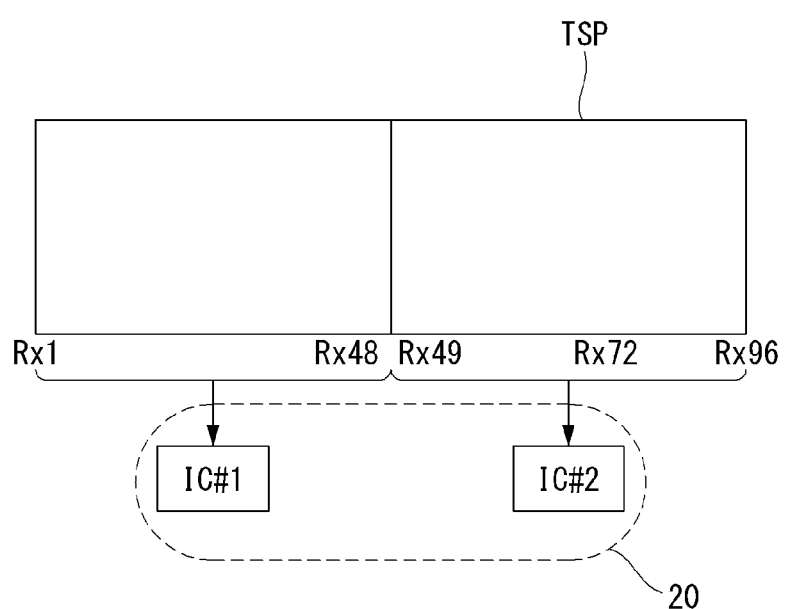
FIG. 4 shows an example of connecting a plurality of touch sensing integrated circuits (ICs) to a large-sized touch screen.

Because the touch sensing IC 20 in the large-sized touch screen TSP has a large number of Tx channels and a large number of Rx channels, two or more touch sensing ICs IC#1 and IC#2 may be connected to the touch screen TSP as shown in FIG. 4. In an example shown in FIG. 4, a first touch sensing IC IC#1 is connected to Tx lines of a first Tx group and Rx lines Rx1 to Rx48 of a first Rx group, and a second touch sensing IC IC#2 is connected to Tx lines of a second Tx group and Rx lines Rx49 to Rx96 of a second Rx group. The first Tx group and the second Tx group are obtained by dividing the Tx lines of the touch screen TSP into two groups. The first touch sensing IC IC#1 supplies the driving signal to the Tx lines of the first Tx group and receives the touch sensor signal synchronized with the driving signal through the Rx lines Rx1 to Rx48. The first touch sensing IC IC#1 senses a change amount of charges of the touch sensors before and after the touch operation and converts the change amount of charges of the touch sensors into touch raw data using the ADC 22. The first touch sensing IC IC#1 decides touch raw data greater than the threshold value as a touch sensor signal of a touch input position. The second touch sensing IC IC#2 supplies the driving signal to the Tx lines of the second Tx group and receives the touch sensor signal synchronized with the driving signal through the Rx lines R49 to Rx96. The second touch sensing IC IC#2 senses a change amount of charges of the touch sensors before and after the touch operation and converts the change amount of charges of the touch sensors into touch raw data using the ADC 22. The second touch sensing IC IC#2 decides touch raw data greater than the threshold value as a touch sensor signal of a touch input position. Each of the first and second touch sensing ICs IC#1 and IC#2 may transmit the touch report including the coordinate information XY of each touch input to the host system 18. One of the first and second touch sensing ICs IC#1 and IC#2 may synchronize the touch report received from the one touch sensing IC and the touch report received from the other touch sensing IC and may transmit it to the host system 18.

Figure 5:
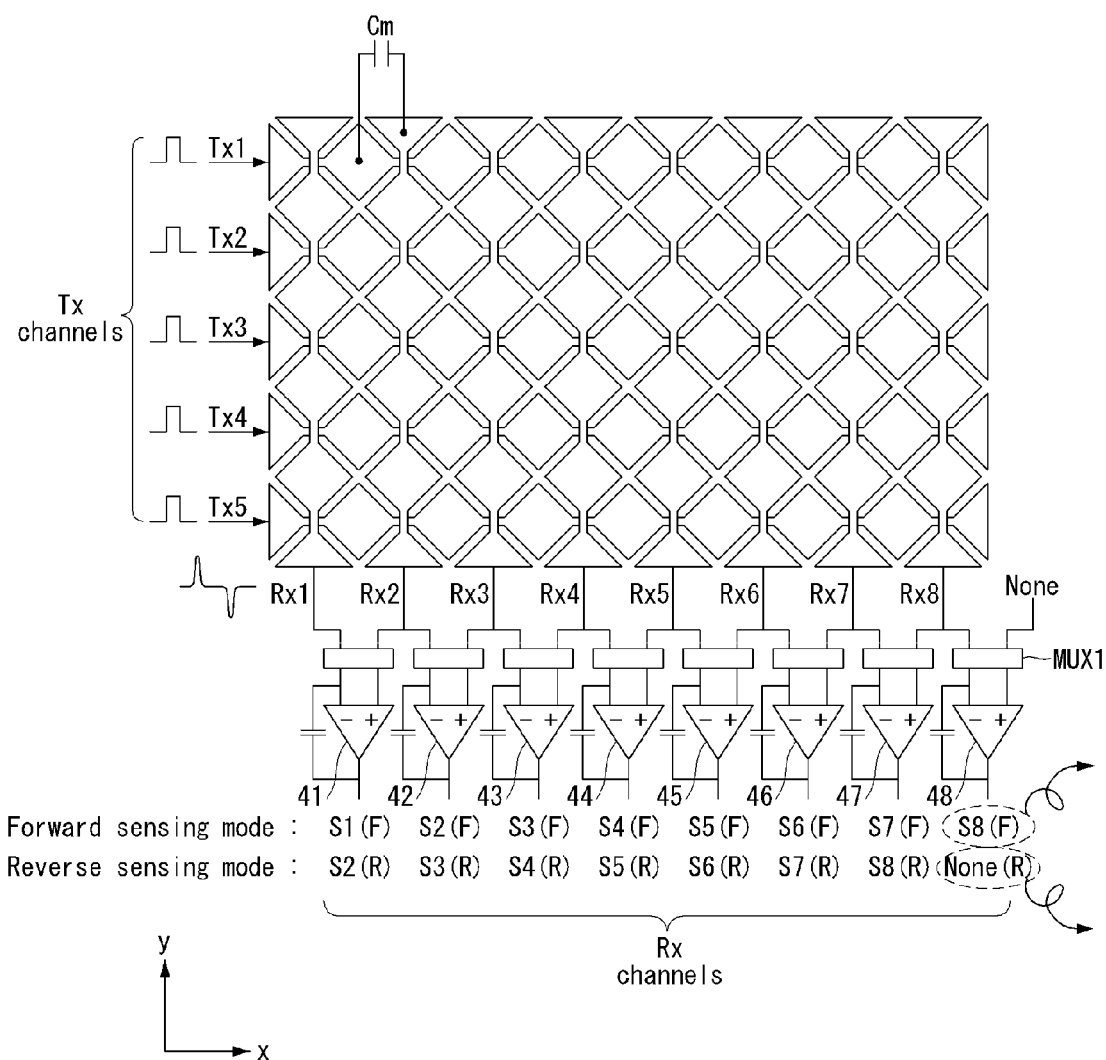
FIG. 5 is a plane view showing a connection structure between a touch screen and differential amplifiers according to a first embodiment of the invention.

Differential amplifiers 41 to 48 may be connected to the Rx lines Rx1 to Rx8 in the same manner as FIG. 5. Each of the differential amplifiers 41 to 48 amplifies a difference between touch sensor signals received through both input terminals of the differential amplifier. A capacitor C is connected between an inverting input terminal (−) and an output terminal of each of the differential amplifiers 41 to 48. Thus, an output signal of each of the differential amplifiers 41 to 48 is an amplification signal of the touch sensor input through the inverting input terminal (−). A noise adversely affecting the touch sensitivity is applied to the touch sensors Cm through a parasitic capacitance of the touch screen TSP. The parasitic capacitance of the touch screen TSP increases when the touch sensors Cm are embedded in the pixel array of the display panel DIS in the in-cell type. Magnitudes of the noises applied to the adjacent touch sensors Cm are almost the same. The differential amplifiers 41 to 48 amplify a difference between the signals received through the adjacent Rx lines and further increase a signal component than the noise. Hence, the signal-to-noise ratio is improved.

A first multiplexer MUX1 is installed to both input terminals of each of the differential amplifiers 41 to 48. The first multiplexer MUX1 switches input signals of the differential amplifiers 41 to 48 when a sensing mode is switched between a forward sensing mode and a reverse sensing mode.

The differential amplifiers 41 to 48 may be implemented as a fully differential amplifier. The fully differential amplifier amplifies a difference between the signals and outputs voltages of positive and negative signals having a complementary relation through a positive output terminal and a negative output terminal.

Figure 8:
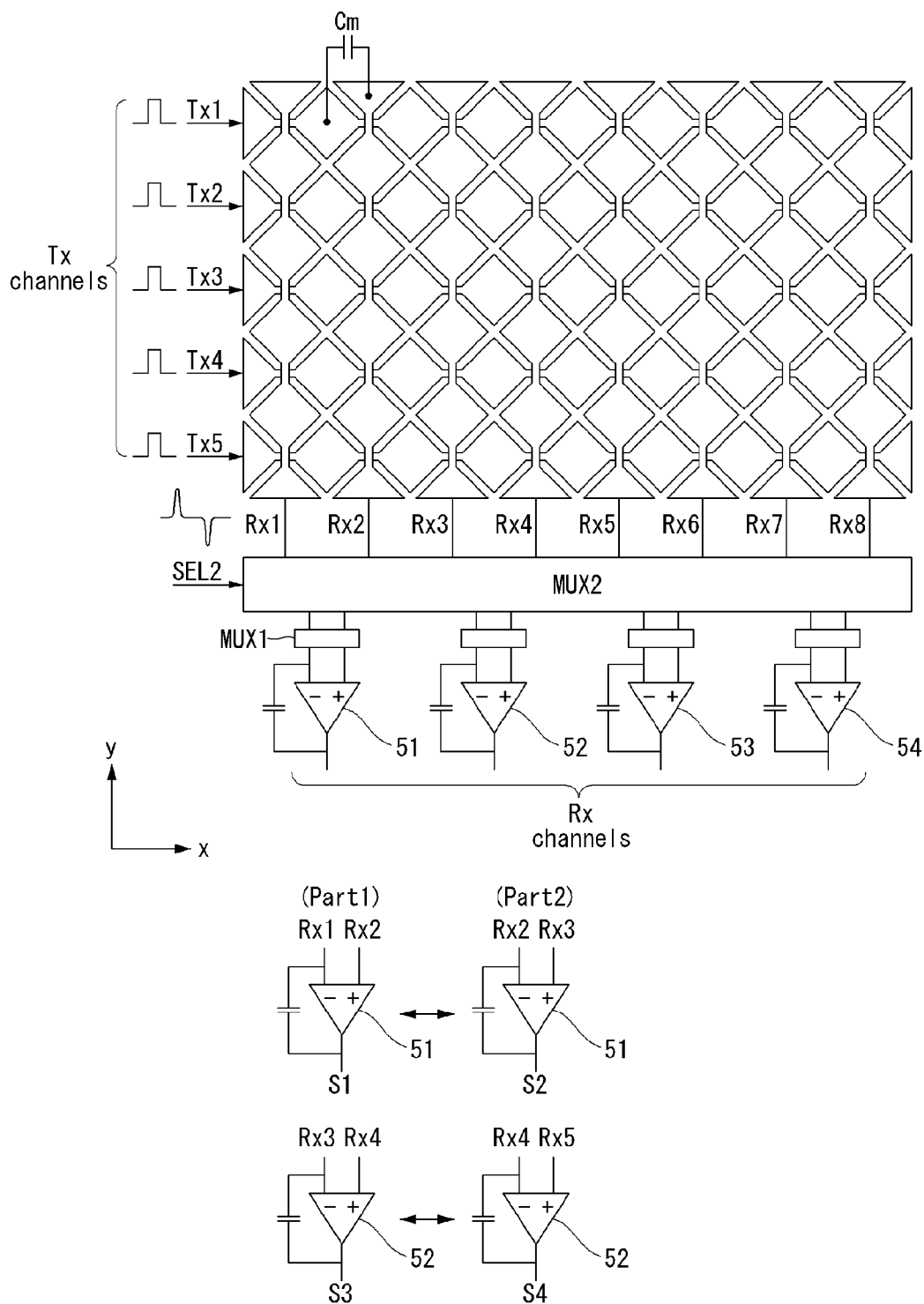
FIG. 8 is a plane view showing a connection structure between a touch screen and differential amplifiers according to a third embodiment of the invention.

As shown in FIG. 8, the touch sensing system according to the embodiment of the invention may connect a second multiplexer MUX2 between the Rx lines Rx1 to Rx8 and differential amplifiers 51 to 54, so as to reduce the number of differential amplifiers. A first multiplexer MUX1 for switching input signals is installed to both input terminals of each of the differential amplifiers 51 to 54.

The display panel DIS includes a liquid crystal layer formed between the upper substrate and the lower substrate. The pixel array of the display panel DIS includes pixels formed in pixel areas defined by data lines D1 to Dm and gate lines (or scan lines) G1 to Gn, where m and n are a positive integer. Each pixel includes thin film transistors (TFTs) formed at crossings of the data lines D1 to Dm and the gate lines G1 to Gn, a pixel electrode charged to a data voltage, a storage capacitor which is connected to the pixel electrode and holds a voltage of liquid crystal cell, and the like.

Black matrixes, color filters, etc. are formed on the upper substrate of the display panel DIS. The lower substrate of the display panel DIS may be configured in a COT (color filter on TFT) structure. In this instance, the black matrixes and the color filters may be formed on the lower substrate of the display panel DIS. Common electrodes, to which a common voltage Vcom is supplied, may be formed on the upper substrate or the lower substrate of the display panel DIS. Polarizing plates are respectively attached to the upper substrate and the lower substrate of the display panel DIS. Alignment layers for setting a pre-tilt angle of liquid crystals are respectively formed on the inner surfaces contacting the liquid crystals in the upper substrate and the lower substrate of the display panel DIS. A column spacer is formed between the upper substrate and the lower substrate of the display panel DIS to keep cell gaps of the liquid crystal cells constant.

A backlight unit may be disposed under a back surface of the display panel DIS. The backlight unit may be implemented as one of an edge type backlight unit and a direct type backlight unit and irradiates light onto the display panel DIS. The display panel DIS may be implemented in any known mode including a twisted nematic (TN) mode, a vertical alignment (VA) mode, an in-plane switching (IPS) mode, a fringe field switching (FFS) mode, etc.

A display driving circuit includes a data driving circuit 12, a scan driving circuit 14, and a timing controller 16. The display driving circuit applies video data of an input image to the pixels of the display panel DIS. The data driving circuit 12 converts digital video data RGB received from the timing controller 16 into positive and negative analog gamma compensation voltages and outputs the data voltage. The data driving circuit 12 then supplies the data voltage to the data lines D1 to Dm. The scan driving circuit 14 sequentially supplies a gate pulse (or scan pulse) synchronized with the data voltage to the gate lines G1 to Gn and selects lines of the display panel DIS to which the data voltage is applied.

The timing controller 16 receives timing signals, such as a vertical sync signal Vsync, a horizontal sync signal Hsync, a data enable signal DE, and a main clock MCLK, from the host system 18. The timing controller 16 generates a data timing control signal and a scan timing control signal for respectively controlling operation timings of the data driving circuit 12 and the scan driving circuit 14 using the timing signals. The data timing control signal includes a source sampling clock SSC, a source output enable signal SOE, a polarity control signal POL, etc. The scan timing control signal includes a gate start pulse GSP, a gate shift clock GSC, a gate output enable signal GOE, and the like.

The host system 18 may be implemented as one of a television system, a set-top box, a navigation system, a DVD player, a Blu-ray player, a personal computer (PC), a home theater system, and a phone system. The host system 18 includes a system on chip (SoC), in which a scaler is embedded, and converts the digital video data RGB of the input image into a data format suitable for displaying on the display panel DIS. The host system 18 transmits the digital video data RGB and the timing signals Vsync, Hsync, DE, and MCLK to the timing controller 16. Further, the host system 18 runs an application associated with the coordinate information (XY) of the touch report received from the touch sensing IC 20.

One of both input terminals of the differential amplifier connected to one of edge Rx channels (i.e., a first Rx channel and a last Rx channel) of the touch sensing IC 20 is not connected to the Rx line. Thus, the signal-to-noise ratio of a signal received through one of the first Rx channel and the last Rx channel of the touch sensing IC 20 is less than that in other Rx channels. Hereinafter, the last Rx channel of the touch sensing IC 20 is referred to as an Nth Rx channel, and a last differential amplifier connected to the Nth Rx channel is referred to as an Nth differential amplifier, where N is a positive integer equal to or greater than 2.

The touch sensing IC 20 according to the embodiment of the invention switches the signals input to both input terminals of each differential amplifier, obtains two adjacent touch sensor signals from each differential amplifier, converts the two adjacent touch sensor signals into the touch raw data through the ADC 22, and stores the touch raw data in the memory 23, so as to solve the above-described problem. The touch sensing IC 20 removes the touch raw data of the first Rx channel or the Nth Rx channel having the small signal-to-noise ratio among the touch sensor signals successively output from the differential amplifiers, and properly combines the remaining touch raw data as many as the number of Rx channels.

A method for switching the signals input to both input terminals of each differential amplifier is distinguished in the forward sensing mode and the reverse sensing mode.

FIGS. 5 to 10 show a connection structure between the touch screen and the differential amplifiers on the assumption that the number of Rx lines formed on the touch screen is eight.

Figure 6:
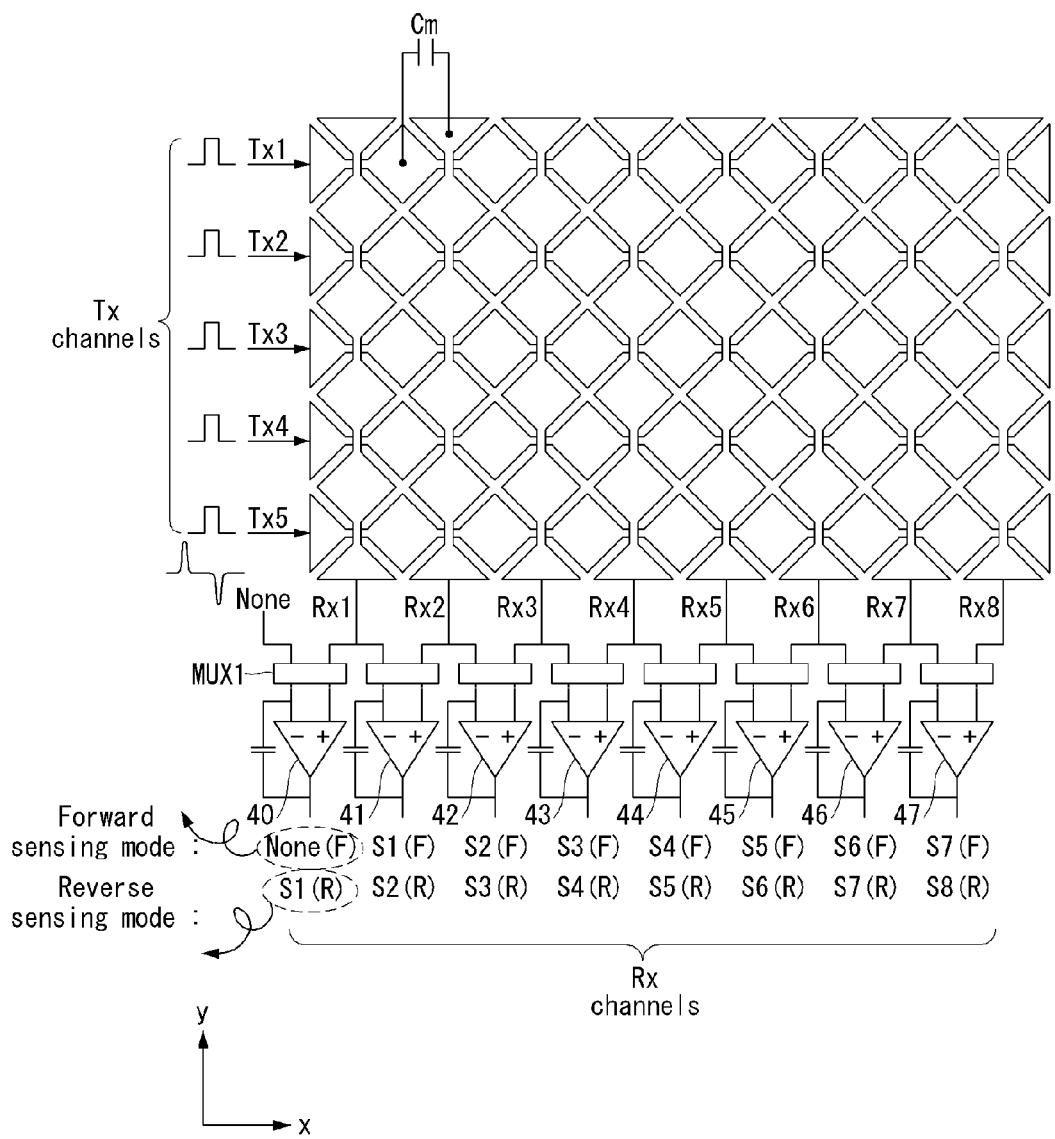
FIG. 6 is a plane view showing a connection structure between a touch screen and differential amplifiers according to a second embodiment of the invention.
Figure 7:
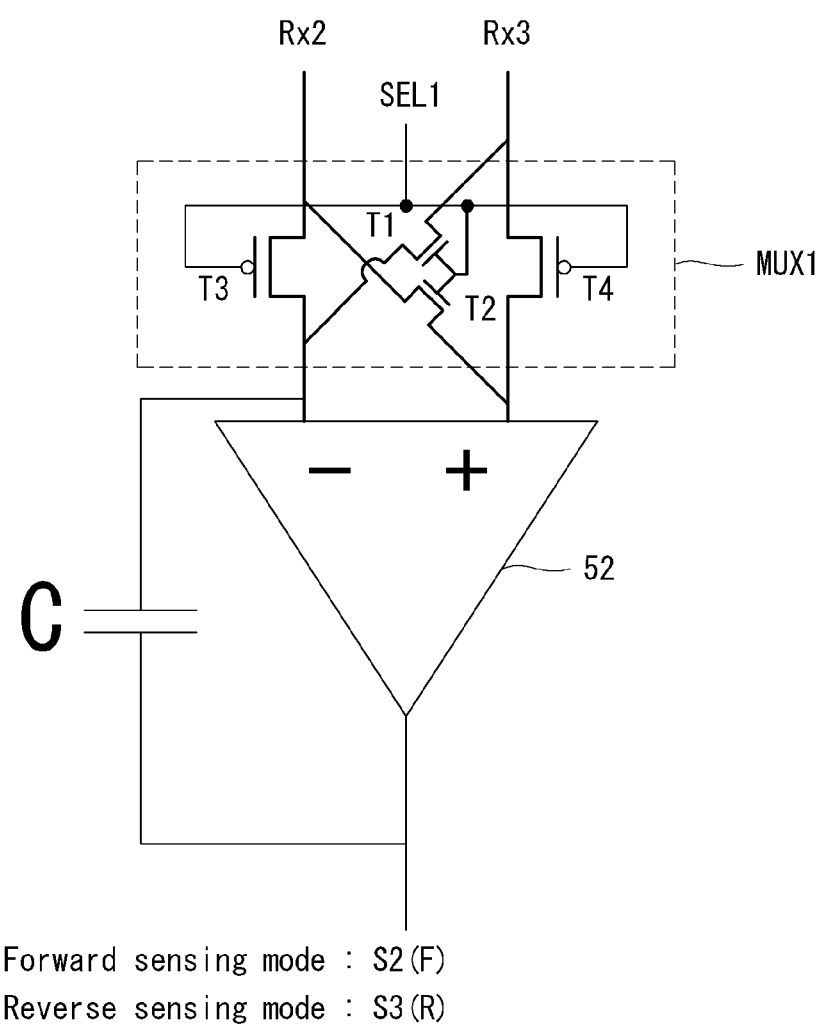
FIG. 7 is a circuit diagram showing a first multiplexer for switching an input signal of each of differential amplifiers in a forward sensing mode and a reverse sensing mode.

As shown in FIGS. 5 to 7, a first differential amplifier 41 amplifies a difference between touch sensor signals received through the first Rx line Rx1 and the second Rx line Rx2. A second differential amplifier 42 amplifies a difference between touch sensor signals received through the second Rx line Rx2 and the third Rx line Rx3. A third differential amplifier 43 amplifies a difference between touch sensor signals received through the third Rx line Rx3 and the fourth Rx line Rx4. An ith differential amplifier amplifies a difference between touch sensor signals received through an ith Rx line Rxi and an (i+1)th Rx line Rx(i+1). Only one of both input terminals of an eighth differential amplifier 48 connected to an eighth Rx channel of the touch sensing IC 20 is connected to the eighth Rx line Rx8, and the other input terminal is not connected to the Rx line.

When the sensing mode is switched between the forward sensing mode and the reverse sensing mode, the first multiplexer MUX1 switches the touch sensor signals input to both input terminals of each of the differential amplifiers 41 to 48 in reverse. As shown in FIG. 7, the touch sensing IC 20 outputs a first selection signal SEL1 for controlling the forward sensing mode and the reverse sensing mode and controls the first multiplexer MUX1.

The first multiplexer MUX1 includes first and second input terminals and first and second output terminals. The first input terminal of the first multiplexer MUX1 is connected to the ith Rx line Rxi receiving an ith touch sensor signal, and the second input terminal of the first multiplexer MUX1 is connected to the (i+1)th Rx line Rx(i+1) receiving an (i+1)th touch sensor signal. The first output terminal of the first multiplexer MUX1 is connected to the inverting input terminal (−) of the differential amplifier, and the second output terminal of the first multiplexer MUX1 is connected to the non-inverting input terminal (+) of the differential amplifier.

The first multiplexer MUX1 includes first to fourth TFTs T1 to T4. When the first and second TFTs T1 and T2 are implemented as an n-type TFT, the third and fourth TFTs T3 and T4 are implemented as a p-type TFT. Thus, an on-state or an off-state of the first and second TFTs T1 and T2 is the reverse of the third and fourth TFTs T3 and T4. For example, when the first and second TFTs T1 and T2 are in an on-state, the third and fourth TFTs T3 and T4 are in an off-state.

The first selection signal SEL1 is input to a gate electrode of each of the first to fourth TFTs T1 to T4. A drain electrode of the first TFT T1 is connected to the (i+1)th Rx line Rx(i+1), and a source electrode of the first TFT T1 is connected to the inverting input terminal (−) of the differential amplifier. A drain electrode of the second TFT T2 is connected to the ith Rx line Rxi, and a source electrode of the second TFT T2 is connected to the non-inverting input terminal (+) of the differential amplifier. A source electrode of the third TFT T3 is connected to the ith Rx line Rxi, and a drain electrode of the third TFT T3 is connected to the inverting input terminal (−) of the differential amplifier. A source electrode of the fourth TFT T4 is connected to the (i+1)th Rx line Rx(i+1), and a drain electrode of the fourth TFT T4 is connected to the non-inverting input terminal (+) of the differential amplifier.

The first TFT T1 is turned on in response to a high logic voltage of the first selection signal SEL1 generated in the reverse sensing mode and connects the (i+1)th Rx line to the inverting input terminal (−) of the differential amplifier. The second TFT T2 is turned on in response to the high logic voltage of the first selection signal SEL1 generated in the reverse sensing mode and connects the ith Rx line to the non-inverting input terminal (+) of the differential amplifier. The third and fourth TFTs T3 and T4 are maintained in the off-state in the reverse sensing mode. The third TFT T3 is turned on in response to a low logic voltage of the first selection signal SEL1 generated in the forward sensing mode and connects the ith Rx line to the inverting input terminal (−) of the differential amplifier. The fourth TFT T4 is turned on in response to the low logic voltage of the first selection signal SEL1 generated in the forward sensing mode and connects the (i+1)th Rx line to the non-inverting input terminal (+) of the differential amplifier. The first and second TFTs T1 and T2 are maintained in the off-state in the forward sensing mode.

An ith touch sensor signal is a touch sensor signal received through the ith Rx line Rxi, and an (i+1)th touch sensor signal is a touch sensor signal received through the (i+1)th Rx line Rx(i+1). The ith touch sensor signal is input to an inverting input terminal (−) of an ith differential amplifier through the first multiplexer MUX1 in the forward sensing mode and is input to a non-inverting input terminal (+) of the ith differential amplifier through the first multiplexer MUX1 in the reverse sensing mode. On the other hand, the (i+1)th touch sensor signal is input to the non-inverting input terminal (+) of the ith differential amplifier through the first multiplexer MUX1 in the forward sensing mode and is input to the inverting input terminal (−) of the ith differential amplifier through the first multiplexer MUX1 in the reverse sensing mode. Thus, the ith differential amplifier outputs a signal obtained by amplifying a difference between the ith touch sensor signal and the (i+1)th touch sensor signal as an ith touch sensor signal in the forward sensing mode. Further, the ith differential amplifier outputs a signal obtained by amplifying a difference between the ith touch sensor signal and the (i+1)th touch sensor signal as an (i+1)th touch sensor signal in the reverse sensing mode. For example, the second differential amplifier 52 outputs a signal obtained by amplifying a difference between a second touch sensor signal and a third touch sensor signal as a second touch sensor signal S2(F) in the forward sensing mode. Further, the second differential amplifier 52 outputs a signal obtained by amplifying a difference between the second touch sensor signal and the third touch sensor signal as a third touch sensor signal S3(R) in the reverse sensing mode.

The first differential amplifier 41 outputs a first touch sensor signal S1(F) in the forward sensing mode. In the same manner, in the forward sensing mode, the second differential amplifier 42 outputs a second touch sensor signal S2(F); the third differential amplifier 43 outputs a third touch sensor signal S3(F); the fourth differential amplifier 44 outputs a fourth touch sensor signal S4(F); the fifth differential amplifier 45 outputs a fifth touch sensor signal S5(F); the sixth differential amplifier 46 outputs a sixth touch sensor signal S6(F); and the seventh differential amplifier 47 outputs a seventh touch sensor signal S7(F). Because there is no signal input to one input terminal of the eighth differential amplifier 48, the eighth differential amplifier 48 outputs a meaningless signal S8(F) having the bad signal-to-noise ratio. In the forward sensing mode, the touch sensor signals received through the differential amplifiers 41 to 48 are accumulated in the integrator 21, are converted into the touch raw data through the ADC 22, and are stored in the memory 23. The touch raw data of the output signal S8(F) of the eighth differential amplifier 48 stored in the memory 23 is not used to decide the touch input and is ignored.

When the forward sensing mode is switched to the reverse sensing mode, the signals input to both input terminals of each of the differential amplifiers 41 to 48 are switched due to a switching operation of the first multiplexer MUX1. In the reverse sensing mode, the signals input to both input terminals of each of the differential amplifiers 41 to 48 are switched by the first multiplexer MUX1. As a result, the first differential amplifier 41 outputs a second touch sensor signal S2(R). Further, the second differential amplifier 42 outputs a third touch sensor signal S3(R); the third differential amplifier 43 outputs a fourth touch sensor signal S4(R); the fourth differential amplifier 44 outputs a fifth touch sensor signal S5(R); the fifth differential amplifier 45 outputs a sixth touch sensor signal S6(R); the sixth differential amplifier 46 outputs a seventh touch sensor signal S7(R); and the seventh differential amplifier 47 outputs an eighth touch sensor signal S8(R). Because there is no signal input to one input terminal of the eighth differential amplifier 48, the eighth differential amplifier 48 outputs a meaningless signal None(R) having the bad signal-to-noise ratio. In the reverse sensing mode, the touch sensor signals received through the differential amplifiers 41 to 48 are accumulated in the integrator 21, are converted into the touch raw data through the ADC 22, and are stored in the memory 23.

The touch sensing IC 20 selects one of a forward sensing result and a reverse sensing result, which are previously stored in the memory 23 and overlap in each Rx channel. Then, the touch sensing IC 20 uses the selected result to decide the touch input and ignores the results S8(F) and None(R). For example, the touch sensing IC 20 selects S1(F), S2(F), S3(F), S4(F), S5(F), S6(F), and S7(F) among the forward sensing results and selects S8(R) among the reverse sensing results, instead of S8(F). The touch sensing IC 20 compares the selected results S1(F) to S7(F) and S8(R) with a threshold value. Hence, the touch sensing IC 20 decides whether or not there is the touch input and calculates coordinate information of each touch input.

FIG. 6 is a plane view showing a connection structure between a touch screen and differential amplifiers according to a second embodiment of the invention. More specifically, FIG. 6 shows an example where one of both input terminals of a zeroth differential amplifier 40 connected to a first Rx channel is not connected to the sensing line.

As shown in FIGS. 6 and 7, each of differential amplifiers 40 to 47 includes an inverting input terminal (−), a non-inverting input terminal (+), an output terminal, and a capacitor C connected between the inverting input terminal (−) and the output terminal.

The inverting input terminals (−) and the non-inverting input terminals (+) of the other differential amplifiers 41 to 47, except the zeroth differential amplifier 40 connected to the first Rx channel of the touch sensing IC 20, are connected to the adjacent Rx lines. However, one input terminal of the zeroth differential amplifier 40 is not connected to any Rx line.

In the forward sensing mode, the inverting input terminal (−) of each of the other differential amplifiers 41 to 47 except the zeroth differential amplifier 40 is connected to the ith Rx line, and the non-inverting input terminal (+) of each of the other differential amplifiers 41 to 47 except the zeroth differential amplifier 40 is connected to the (i+1)th Rx line. In the reverse sensing mode, the inverting input terminal (−) of each of the other differential amplifiers 41 to 47 except the zeroth differential amplifier 40 is connected to the (i+1)th Rx line, and the non-inverting input terminal (+) of each of the other differential amplifiers 41 to 47 except the zeroth differential amplifier 40 is connected to the ith Rx line.

In the forward sensing mode, the inverting input terminals (−) of the zeroth differential amplifier 40 is not connected to any Rx line, and the non-inverting input terminal (+) of the zeroth differential amplifier 40 is connected to the first Rx line Rx1. In the reverse sensing mode, the inverting input terminals (−) of the zeroth differential amplifier 40 is connected to the first Rx line Rx1, and the non-inverting input terminal (+) of the zeroth differential amplifier 40 is not connected to any Rx line.

In the forward sensing mode, the zeroth differential amplifier 40 outputs a meaningless signal None(F). The first differential amplifier 41 outputs a first touch sensor signal S1(F); the second differential amplifier 42 outputs a second touch sensor signal S2(F); the third differential amplifier 43 outputs a third touch sensor signal S3(F); the fourth differential amplifier 44 outputs a fourth touch sensor signal S4(F); the fifth differential amplifier 45 outputs a fifth touch sensor signal S5(F); the sixth differential amplifier 46 outputs a sixth touch sensor signal S6(F); and the seventh differential amplifier 47 outputs a seventh touch sensor signal S7(F). In the forward sensing mode, the touch sensor signals received through the differential amplifiers 40 to 47 are accumulated in the integrator 21, are converted into the touch raw data through the ADC 22, and are stored in the memory 23. The touch raw data of the output signal None(F) of the zeroth differential amplifier 40 stored in the memory 23 is not used to decide the touch input and is ignored.

When the forward sensing mode is switched to the reverse sensing mode, the signals input to both input terminals of each of the differential amplifiers 40 to 47 are switched due to a switching operation of the first multiplexer MUX1. In the reverse sensing mode, the signals input to both input terminals of each of the differential amplifiers 40 to 47 are switched by the first multiplexer MUX1. As a result, the zeroth differential amplifier 40 outputs a first touch sensor signal S1(R) having the low signal-to-noise ratio. The first differential amplifier 41 outputs a second touch sensor signal S2(R); the second differential amplifier 42 outputs a third touch sensor signal S3(R); the third differential amplifier 43 outputs a fourth touch sensor signal S4(R); the fourth differential amplifier 44 outputs a fifth touch sensor signal S5(R); the fifth differential amplifier 45 outputs a sixth touch sensor signal S6(R); the sixth differential amplifier 46 outputs a seventh touch sensor signal S7(R); and the seventh differential amplifier 47 outputs an eighth touch sensor signal S8(R). In the reverse sensing mode, the touch sensor signals received through the differential amplifiers 40 to 47 are accumulated in the integrator 21, are converted into the touch raw data through the ADC 22, and are stored in the memory 23.

The touch sensing IC 20 selects one of a forward sensing result and a reverse sensing result, which are previously stored in the memory 23 and overlap in each Rx channel. Then, the touch sensing IC 20 uses the selected result to decide the touch input and ignores the results None(F) and S1(R). For example, the touch sensing IC 20 selects S1(F), S2(F), S3(F), S4(F), S5(F), S6(F), and S7(F) among the forward sensing results and selects S8(R) among the reverse sensing results. The touch sensing IC 20 compares the selected results S1(F) to S7(F) and S8(R) with a threshold value. Hence, the touch sensing IC 20 decides whether or not there is the touch input and calculates coordinate information of each touch input.

FIG. 8 is a plane view showing a connection structure between a touch screen and differential amplifiers according to a third embodiment of the invention. FIG. 9 shows changes in input and output of the differential amplifiers shown in FIG. 8 in a forward sensing mode and a reverse sensing mode.

As shown in FIGS. 8 and 9, when the sensing mode is switched between the forward sensing mode and the reverse sensing mode, the first multiplexer MUX1 switches touch sensor signals input to both input terminals of each of differential amplifiers 51 to 54. The touch sensing IC 20 outputs a first selection signal SEL1 for controlling the forward sensing mode and the reverse sensing mode and controls the first multiplexer MUX1.

The first multiplexer MUX1 includes first and second input terminals and first and second output terminals. The first input terminal of the first multiplexer MUX1 is connected to the ith Rx line Rxi receiving an ith touch sensor signal, and the second input terminal of the first multiplexer MUX1 is connected to the (i+1)th Rx line Rx(i+1) receiving an (i+1)th touch sensor signal. The first output terminal of the first multiplexer MUX1 is connected to the inverting input terminal (−) of the differential amplifier, and the second output terminal of the first multiplexer MUX1 is connected to the non-inverting input terminal (+) of the differential amplifier. Circuit configuration of the first multiplexer MUX1 is substantially the same as that shown in FIG. 7.

The touch sensing system according to the embodiment of the invention further includes a second multiplexer MUX2 formed between the Rx lines Rx1 to Rx8 and the differential amplifiers 51 to 54, so as to reduce the number of differential amplifiers. The second multiplexer MUX2 performs a process 'part1' for connecting the ith and (i+1)th Rx lines to both input terminals of each of the differential amplifiers 51 to 54 and then performs a process 'part2' for connecting the (i+1)th and (i+2)th Rx lines to both input terminals of each of the differential amplifiers 51 to 54. Thus, the differential amplifiers 51 to 54 perform the process 'part1' for amplifying a difference between touch sensor signals received through the ith and (i+1)th Rx lines to output the amplified ith touch sensor signal and then perform the process 'part2' for amplifying a difference between touch sensor signals received through the (i+1)th and (i+2)th Rx lines to output the amplified (i+1)th touch sensor signal. The touch sensing IC 20 outputs a second selection signal SEL2 for controlling the processes 'part1' and 'part2' and controls the second multiplexer MUX2.

The differential amplifiers 51 to 54 operate in the manner shown in FIG. 9 due to a switching operation of the input signals of the first and second multiplexers MUX1 and MUX2. Both input terminals of each of the other differential amplifiers 51 to 53, except the fourth differential amplifier 54 connected to the eighth Rx channel of the touch sensing IC 20, are connected to the Rx lines in the forward sensing mode and the reverse sensing mode. In the fourth differential amplifier 54, only one input terminal is connected to the eighth Rx line Rx8. When the fourth differential amplifier 54 is referred to as an Nth differential amplifier, an inverting input terminal of the Nth differential amplifier is connected to an (N−1)th Rx line, and a non-inverting input terminal of the Nth differential amplifier is connected to an Nth Rx line for 'pun' time of the forward sensing mode. For 'part2' time of the forward sensing mode, the inverting input terminal of the Nth differential amplifier is connected to the Nth Rx line, and the non-inverting input terminal of the Nth differential amplifier is not connected to any Rx line. For 'part1' time of the reverse sensing mode, the inverting input terminal of the Nth differential amplifier is connected to the Nth Rx line, and the non-inverting input terminal of the Nth differential amplifier is connected to the (N−1)th Rx line. For 'part2' time of the reverse sensing mode, the inverting input terminal of the Nth differential amplifier is not connected to any Rx line, and the non-inverting input terminal of the Nth differential amplifier is connected to the Nth Rx line.

The ith touch sensor signal is a touch sensor signal received through the ith Rx line Rxi, and the (i+1)th touch sensor signal is a touch sensor signal received through the (i+1)th Rx line Rx(i+1). An (i+2)th touch sensor signal is a touch sensor signal received through the (i+2)th Rx line Rx(i+2). For the 'part1' time of the forward sensing mode, the ith touch sensor signal is input to the inverting input terminal (−) of the differential amplifier, and the (i+1)th touch sensor signal is input to the non-inverting input terminal (+) of the differential amplifier. For the 'part2' time of the forward sensing mode, the (i+1)th touch sensor signal is input to the inverting input terminal (−) of the differential amplifier, and the (i+2)th touch sensor signal is input to the non-inverting input terminal (+) of the differential amplifier. For the 'part1' time of the reverse sensing mode, the (i+1)th touch sensor signal is input to the inverting input terminal (−) of the differential amplifier, and the ith touch sensor signal is input to the non-inverting input terminal (+) of the differential amplifier. For the 'part2' time of the reverse sensing mode, the (i+2)th touch sensor signal is input to the inverting input terminal (−) of the differential amplifier, and the (i+1)th touch sensor signal is input to the non-inverting input terminal (+) of the differential amplifier. Thus, the differential amplifier amplifies a difference between the ith and (i+1)th touch sensor signals and outputs an amplified ith touch sensor signal Si(F) for the 'part1' time of the forward sensing mode. Then, the differential amplifier amplifies a difference between the (i+1)th and (i+2)th touch sensor signals and outputs an amplified (i+1)th touch sensor signal Si+1(F) for the 'part2' time of the forward sensing mode. Further, the differential amplifier amplifies a difference between the (i+1)th and ith touch sensor signals and outputs an amplified (i+1)th touch sensor signal Si+1(R) for the 'part1' time of the reverse sensing mode. Then, the differential amplifier amplifies a difference between the (i+2)th and (i+1)th touch sensor signals and outputs an amplified (i+2)th touch sensor signal Si+2(R) for the 'part2' time of the reverse sensing mode.

For the 'part1' time of the forward sensing mode, the first differential amplifier 51 outputs a first touch sensor signal S1(F); the second differential amplifier 52 outputs a third touch sensor signal S3(F); the third differential amplifier 53 outputs a fifth touch sensor signal S5(F); and the fourth differential amplifier 54 outputs a seventh touch sensor signal S7(F). When the 'part1' operation of the forward sensing mode is switched to the 'part2' operation of the forward sensing mode, the signals input to both input terminals of each of the differential amplifiers 51 to 54 are sequentially converted into shifted signals due to the switching operation of the second multiplexer MUX2. As a result, for the 'part2' time of the forward sensing mode, the first differential amplifier 51 outputs a second touch sensor signal S2(F); the second differential amplifier 52 outputs a fourth touch sensor signal S4(F); the third differential amplifier 53 outputs a sixth touch sensor signal S6(F); and the fourth differential amplifier 54 outputs an eighth touch sensor signal S8(F) having the bad signal-to-noise ratio because there is no signal input to one input terminal of the fourth differential amplifier 54. In the forward sensing mode, the touch sensor signals S1(F) to S8(F) received through the differential amplifiers 51 to 54 are accumulated in the integrator 21, are converted into touch raw data through the ADC 22, and are stored in the memory 23. The touch raw data of the eighth touch sensor signal S8(F) of the fourth differential amplifier 54 stored in the memory 23 is not used to decide the touch input and is ignored.

When the forward sensing mode is switched to the reverse sensing mode, the signals input to both input terminals of each of the differential amplifiers 51 to 54 are switched due to a switching operation of the first multiplexer MUX1. For the 'part1' time of the reverse sensing mode, the first differential amplifier 51 outputs a second touch sensor signal S2(R); the second differential amplifier 52 outputs a fourth touch sensor signal S4(R); the third differential amplifier 53 outputs a sixth touch sensor signal S6(R); and the fourth differential amplifier 54 outputs an eighth touch sensor signal S8(R). When the 'part1' operation of the reverse sensing mode is switched to the 'part2' operation of the reverse sensing mode, the signals input to both input terminals of each of the differential amplifiers 51 to 54 are sequentially converted into shifted signals due to the switching operation of the second multiplexer MUX2. As a result, for the 'part2' time of the reverse sensing mode, the first differential amplifier 51 outputs a third touch sensor signal S3(R); the second differential amplifier 52 outputs a fifth touch sensor signal S5(R); the third differential amplifier 53 outputs a sixth touch sensor signal S6(R); and the fourth differential amplifier 54 outputs a meaningless signal None (R). In the reverse sensing mode, the touch sensor signals S2(R) to S8(R) and None(R) received through the differential amplifiers 51 to 54 are accumulated in the integrator 21, are converted into touch raw data through the ADC 22, and are stored in the memory 23.

The touch sensing IC 20 selects one of a forward sensing result and a reverse sensing result, which are previously stored in the memory 23 and overlap in each Rx channel. Then, the touch sensing IC 20 uses the selected result to decide the touch input and ignores the results S8(F) and None(R). For example, the touch sensing IC 20 selects S1(F), S2(F), S3(F), S4(F), S5(F), S6(F), and S7(F) among the forward sensing results and selects S8(R) among the reverse sensing results, instead of S8(F). The touch sensing IC 20 compares the selected results S1(F) to S7(F) and S8(R) with a threshold value. Hence, the touch sensing IC 20 decides whether or not there is the touch input and calculates coordinate information of each touch input.

FIG. 10 is a plane view showing a connection structure between a touch screen and differential amplifiers according to a fourth embodiment of the invention.

As shown in FIG. 10, inverting input terminals (−) and non-inverting input terminals (+) of other differential amplifiers 52 to 54, except a first differential amplifier 51 connected to the first Rx channel of the touch sensing IC 20, are connected to the adjacent Rx lines. However, one input terminal of the first differential amplifier 51 is not connected to any Rx line.

For the 'part1' time of the forward sensing mode, the inverting input terminal (−) of each of the other differential amplifiers 52 to 54 except the first differential amplifier 51 is connected to the ith Rx line, and the non-inverting input terminal (+) of each of the other differential amplifiers 52 to 54 except the first differential amplifier 51 is connected to the (i+1)th Rx line. For the 'part2' time of the forward sensing mode, the inverting input terminal (−) of each of the differential amplifiers 52 to 54 is connected to the (i+1)th Rx line, and the non-inverting input terminal (+) of each of the differential amplifiers 52 to 54 is connected to the (i+2)th Rx line. For the 'part1' time of the reverse sensing mode, the inverting input terminal (−) of each of the differential amplifiers 52 to 54 is connected to the (i+1)th Rx line, and the non-inverting input terminal (+) of each of the differential amplifiers 52 to 54 is connected to the ith Rx line. For the 'part2' time of the reverse sensing mode, the inverting input terminal (−) of each of the differential amplifiers 52 to 54 is connected to the (i+2)th Rx line, and the non-inverting input terminal (+) of each of the differential amplifiers 52 to 54 is connected to the (i+1)th Rx line.

For the 'part1' time of the forward sensing mode, the inverting input terminal (−) of the first differential amplifier 51 is not connected to any Rx line, and the non-inverting input terminal (+) of the first differential amplifier 51 is connected to the first Rx line Rx1. For the 'part2' time of the forward sensing mode, the inverting input terminal (−) of the first differential amplifier 51 is connected to the first Rx line Rx1, and the non-inverting input terminal (+) of the first differential amplifier 51 is connected to the second Rx line Rx2. For the 'part1' time of the reverse sensing mode, the inverting input terminal (−) of the first differential amplifier 51 is connected to the first Rx line Rx1, and the non-inverting input terminal (+) of the first differential amplifier 51 is not connected to any Rx line. For the 'part2' time of the reverse sensing mode, the inverting input terminal (−) of the first differential amplifier 51 is connected to the second Rx line Rx2, and the non-inverting input terminal (+) of the first differential amplifier 51 is connected to the first Rx line Rx1.

For the 'part1' time of the forward sensing mode, the first differential amplifier 51 outputs a meaningless signal None (F); the second differential amplifier 52 outputs a second touch sensor signal S2(F); the third differential amplifier 53 outputs a fourth touch sensor signal S4(F); and the fourth differential amplifier 54 outputs a sixth touch sensor signal S6(F). When the 'part1' operation of the forward sensing mode is switched to the 'part2' operation of the forward sensing mode, the signals input to both input terminals of each of the differential amplifiers 51 to 54 are sequentially converted into shifted signals due to the switching operation of the second multiplexer MUX2. As a result, for the 'part2' time of the forward sensing mode, the first differential amplifier 51 outputs a first touch sensor signal S1(F); the second differential amplifier 52 outputs a third touch sensor signal S3(F); the third differential amplifier 53 outputs a fifth touch sensor signal S5(F); and the fourth differential amplifier 54 outputs a seventh touch sensor signal S7(F). In the forward sensing mode, the touch sensor signals None(F) and S1(F) to S7(F) received through the differential amplifiers 51 to 54 are accumulated in the integrator 21, are converted into touch raw data through the ADC 22, and are stored in the memory 23. The touch raw data of the meaningless signal None(F) stored in the memory 23 is not used to decide the touch input and is ignored.

When the forward sensing mode is switched to the reverse sensing mode, the signals input to both input terminals of each of the differential amplifiers 51 to 54 are switched due to the switching operation of the first multiplexer MUX1. For the 'part1' time of the reverse sensing mode, the first differential amplifier 51 outputs a first touch sensor signal S1(R) having the low signal-to-noise ratio; the second differential amplifier 52 outputs a third touch sensor signal S3(R); the third differential amplifier 53 outputs a fifth touch sensor signal S5(R); and the fourth differential amplifier 54 outputs a seventh touch sensor signal S7(R). When the 'part1' operation of the reverse sensing mode is switched to the 'part2' operation of the reverse sensing mode, the signals input to both input terminals of each of the differential amplifiers 51 to 54 are sequentially converted into shifted signals due to the switching operation of the second multiplexer MUX2. As a result, for the 'part2' time of the reverse sensing mode, the first differential amplifier 51 outputs a second touch sensor signal S2(R); the second differential amplifier 52 outputs a fourth touch sensor signal S4(R); the third differential amplifier 53 outputs a sixth touch sensor signal S6(R); and the fourth differential amplifier 54 outputs an eighth touch sensor signal S8(R). In the reverse sensing mode, the touch sensor signals S1(R) to S8(R) received through the differential amplifiers 51 to 54 are accumulated in the integrator 21, are converted into touch raw data through the ADC 22, and are stored in the memory 23.

The touch sensing IC 20 selects one of a forward sensing result and a reverse sensing result, which are previously stored in the memory 23 and overlap in each Rx channel. Then, the touch sensing IC 20 uses the selected result to decide the touch input and ignores the results None(F) and S1(R). For example, the touch sensing IC 20 selects S1(F), S2(F), S3(F), S4(F), S5(F), S6(F), and S7(F) among the forward sensing results and selects S8(R) among the reverse sensing results. The touch sensing IC 20 compares the selected results S1(F) to S7(F) and S8(R) with a threshold value. Hence, the touch sensing IC 20 decides whether or not there is the touch input and calculates coordinate information of each touch input.

When the touch sensors are embedded in the display panel in the in-cell type, the touch sensors are greatly affected by the driving signal of the pixels. In this instance, it is preferable, but not required, that a mutual influence between the touch sensors and the pixels is minimized by time-dividing a touch sensing period and a pixel driving period.

Figure 12:
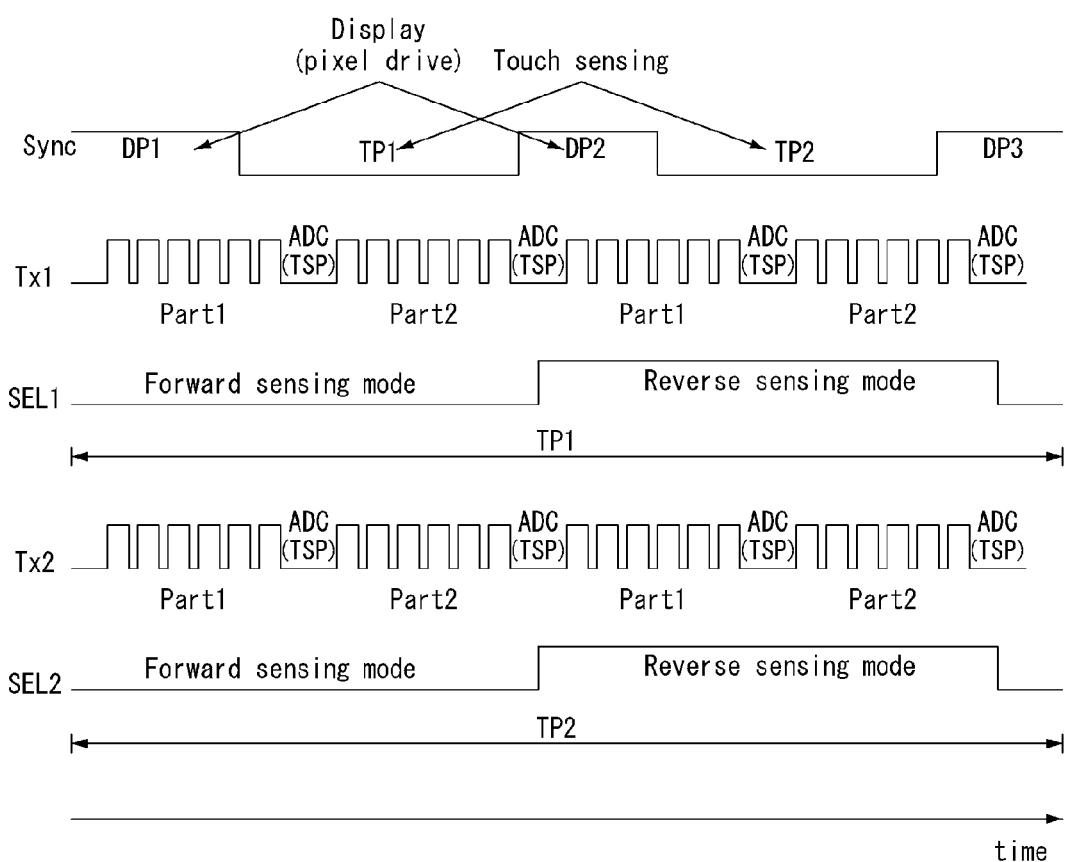
FIGS. 12 to 13B are waveform diagrams showing a method for driving differential amplifiers shown in FIGS. 8 to 10.
Figure 13A:
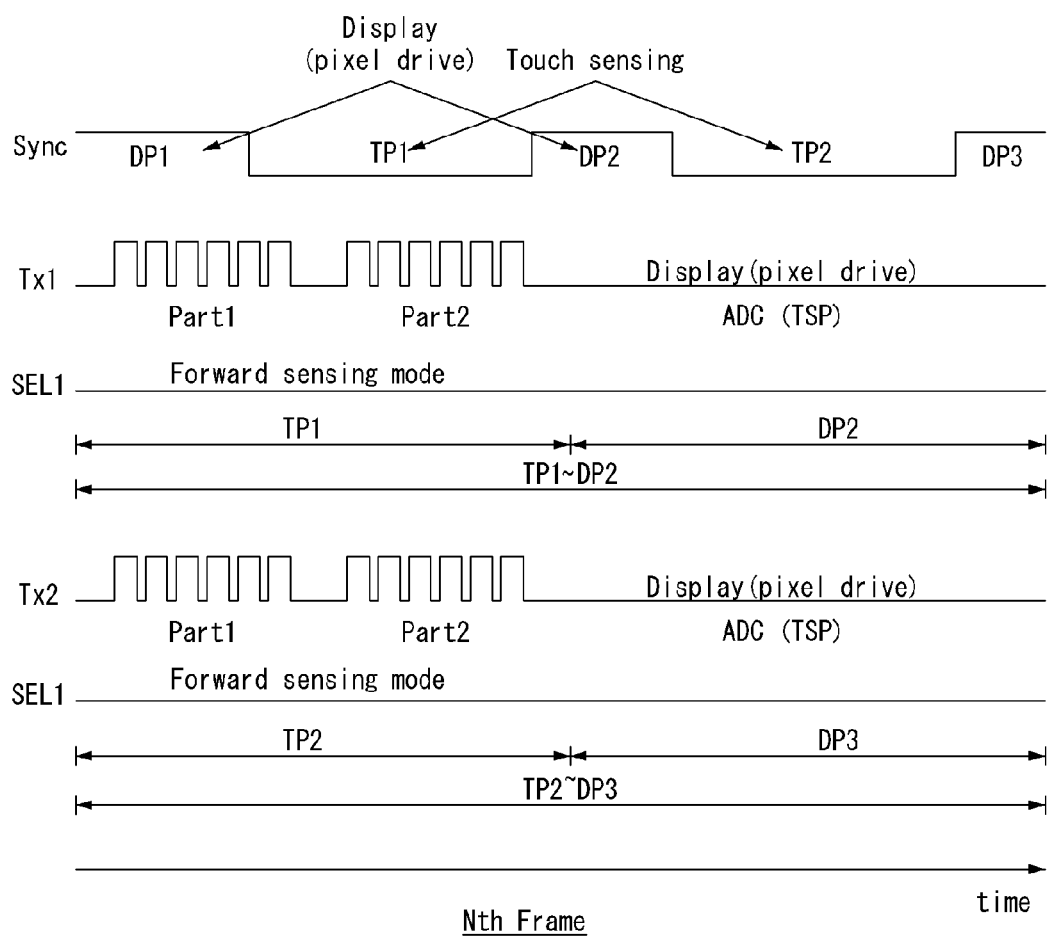
Figure 13B:
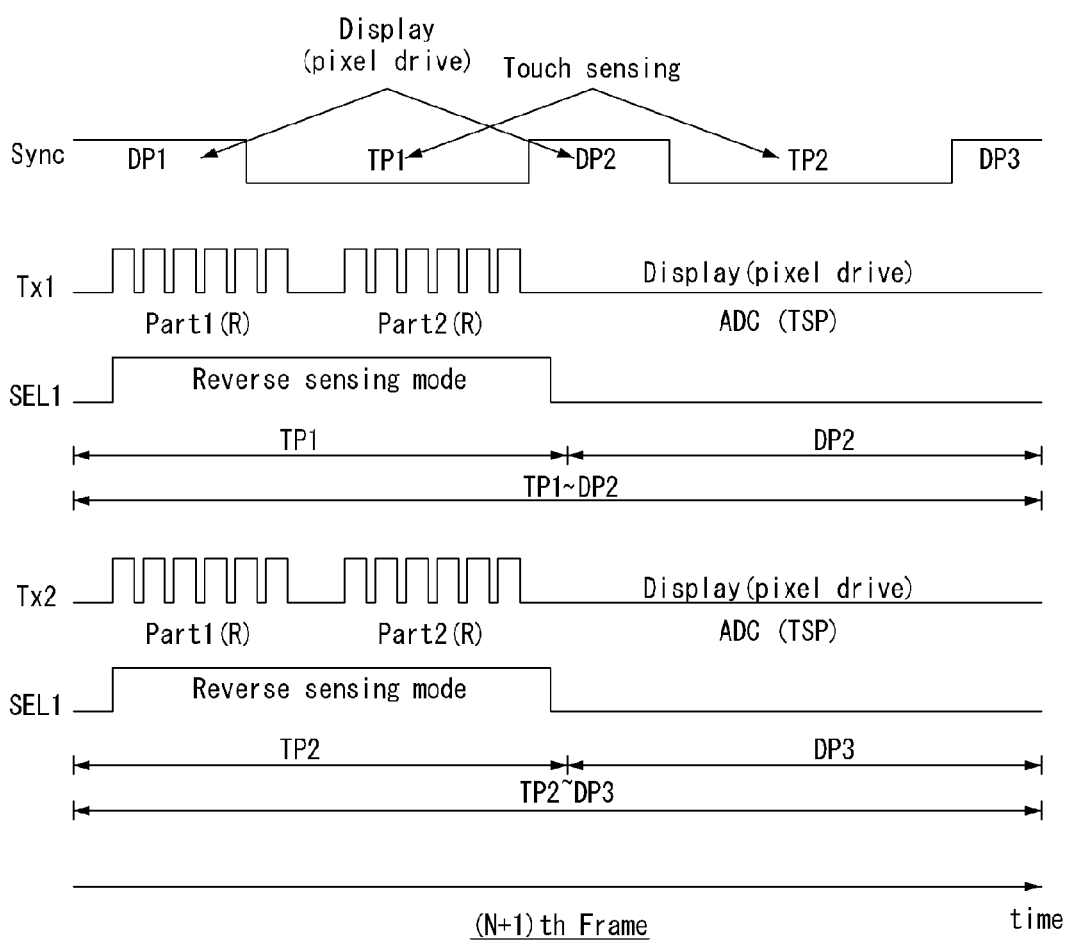

FIGS. 12 to 13B are waveform diagrams showing a method for driving the differential amplifiers shown in FIGS. 8 to 10.

As shown in FIGS. 12 to 13B, one frame period is time-divided into a plurality of pixel driving periods DP1 and DP2 and a plurality of touch sensing periods TP1 and TP2. During the pixel driving periods DP1 and DP2, data of the input image is applied to the pixels. The data applied to the pixels is held during the touch sensing periods TP1 and TP2. The touch sensing IC 20 is driven and senses a touch input during the touch sensing periods TP1 and TP2, and is on standby during the pixel driving periods DP1 and DP2. The pixel driving periods DP1 and DP2 and the touch sensing periods TP1 and TP2 may be alternately arranged.

The timing controller 16 may generate a sync signal Sync defining the pixel driving periods DP1 and DP2 and the touch sensing periods TP1 and TP2 based on the vertical sync signal Vsync. The touch sensing IC 20 may be synchronized with the display driving circuits 12 and 14 in response to the sync signal Sync. A high logic period of the sync signal Sync may define the pixel driving periods DP1 and DP2, and a low logic period of the sync signal Sync may define the touch sensing periods TP1 and TP2, and vice versa.

The touch sensing IC 20 supplies the driving signal to one or more Tx lines and switches the selection signal SEL1 in each of the touch sensing periods TP1 and TP2. Further, in each of the touch sensing periods TP1 and TP2, the touch sensing IC 20 obtains the forward sensing results and the reverse sensing results, removes the sensing result having the bad signal-to-noise ratio among the forward sensing results and the reverse sensing results, and properly combines the remaining sensing results as many as the number of Rx channels, thereby deciding whether or not there is the touch input and calculating coordinate information of each touch input.

As shown in FIG. 12, the touch sensing IC 20 may obtain the forward sensing result and the reverse sensing result of each touch sensor in one frame period. In the touch sensing periods TP1 and TP2, the touch sensing IC 20 is driven, drives the ADC 22 to receive the output of the differential amplifiers, and converts the output of the differential amplifiers into touch raw data. As shown in FIG. 12, the touch sensing IC 20 may drive the ADC 22 between the forward sensing mode and the reverse sensing mode. When the differential amplifiers shown in FIGS. 8 to 10 are time-division driven in the 'part1' time and the 'part2' time in each of the forward sensing mode and the reverse sensing mode, the touch sensing IC 20 may drive the ADC 22 between the forward sensing mode and the reverse sensing mode and also may drive the ADC 22 between the 'part1' time and the 'part2' time of each of the forward sensing mode and the reverse sensing mode.

As shown in FIGS. 13A and 13B, the touch sensing IC 20 may operate in the forward sensing mode during an Nth frame period to obtain the forward sensing result and may operate in the reverse sensing mode during an (N+1)th frame period to obtain the reverse sensing result. The touch sensing IC 20 may be driven to receive the output of the differential amplifiers in the touch sensing periods TP1 and TP2 and may convert the output of the differential amplifiers into the touch raw data during the pixel driving periods DP1 and DP2. In other words, the touch sensing IC 20 may drive the ADC 22 in the pixel driving periods DP1 and DP2. For example, the change amount of charges of the touch sensors obtained from the output of the differential amplifiers in each of the forward sensing mode and the reverse sensing mode of the first touch sensing period TP1 may be converted into the touch raw data through the ADC during the second pixel driving period DP2. The embodiment of the invention parallel-processes an operation for applying the video data to the pixels in the pixel driving period and an ADC driving operation of the touch sensing IC 20, thereby increasing the touch sensing period. Further, an ADC driving time may be sufficiently secured.

As described above, the embodiment of the invention switches the input signals of the differential amplifiers, obtains the forward sensing result and the reverse sensing result of each differential amplifier, removes the sensing result having the bad signal-to-noise ratio, and senses the touch input based on the remaining sensing results. As a result, the touch sensing IC according to the embodiment of the invention may improve the signal-to-noise ratio in all of the receiving channels.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing system, comprising:
a plurality of touch sensors;
sensing lines connected to the touch sensors;
a touch sensing integrated circuit (IC) configured to sense a touch input using signals received through a plurality of channels;
a plurality of differential amplifiers formed between the sensing lines and the channels of the touch sensing IC, each of the plurality of differential amplifiers configured to amplify a difference between touch sensor signals received through adjacent sensing lines; and
a multiplexer configured to connect the adjacent sensing lines to input terminals of each differential amplifier in a forward sensing mode and switch the adjacent sensing lines connected to the input terminals of each differential amplifier in a reverse sensing mode,
wherein the touch sensing IC comprises an integrator connected to the differential amplifiers, an analog-to-digital converter (ADC) converting an output voltage of the integrator into a touch raw data, and a memory to which the touch raw data is stored, and
wherein the touch sensing IC ignores touch raw data of signal received from at least one channel, and combines touch raw data obtained from the forward sensing mode and the reverse sensing mode based on the number of channels.

2. The touch sensing system of claim 1, wherein the touch sensing IC ignores an output signal having a low signal-to-noise ratio among output signals of the differential amplifiers received in the forward sensing mode and output signals of the differential amplifiers received in the reverse sensing mode and senses the touch input based on the remaining output signals.

3. The touch sensing system of claim 2,
wherein the touch sensing IC ignores one of an output signal of a first differential amplifier connected to a first channel and an output signal of an Nth differential amplifier connected to an Nth channel corresponding to a last channel, where N is a positive integer equal to or greater than 2.

4. The touch sensing system of claim 3, wherein each differential amplifier includes an inverting input terminal, a non-inverting input terminal, an output terminal, and a capacitor connected between the inverting input terminal and the output terminal,
wherein an inverting input terminal and a non-inverting input terminal of each of other differential amplifiers except the Nth differential amplifier are connected to adjacent sensing lines, and one input terminal of the Nth differential amplifier is not connected to any sensing line.

5. The touch sensing system of claim 4, wherein the touch sensing IC ignores an output of the Nth differential amplifier and calculates coordinates of a position of the touch input based on sensing results obtained by combining touch raw data obtained from an output of the other differential amplifiers based on the number of channels.

6. The touch sensing system of claim 3, wherein in the forward sensing mode, an inverting input terminal of each of other differential amplifiers except the Nth differential amplifier is connected to an ith sensing line, and a non-inverting input terminal of each of the other differential amplifiers except the Nth differential amplifier is connected to an (i+1)th sensing line, where 'i' is a positive integer,
   wherein in the reverse sensing mode, the inverting input terminal of each of the other differential amplifiers except the Nth differential amplifier is connected to the (i+1)th sensing line, and the non-inverting input terminal of each of the other differential amplifiers except the Nth differential amplifier is connected to the ith sensing line,
   wherein in the forward sensing mode, an inverting input terminal of the Nth differential amplifier is connected to an Nth sensing line, and a non-inverting input terminal of the Nth differential amplifier is not connected to any sensing line,
   wherein in the reverse sensing mode, the inverting input terminal of the Nth differential amplifier is not connected to any sensing line, and the non-inverting input terminal of the Nth differential amplifier is connected to the Nth sensing line.

7. The touch sensing system of claim 3, further comprising a second multiplexer configured to shift the sensing lines connected to the input terminals of the differential amplifiers.

8. The touch sensing system of claim 7, wherein in a first time of the forward sensing mode, an inverting input terminal of each of other differential amplifiers except the Nth differential amplifier is connected to an ith sensing line, and a non-inverting input terminal of each of the other differential amplifiers except the Nth differential amplifier is connected to an (i+1)th sensing line, where 'i' is a positive integer,
   wherein in a second time of the forward sensing mode, the inverting input terminal of each of the other differential amplifiers except the Nth differential amplifier is connected to the (i+1)th sensing line, and the non-inverting input terminal of each of the other differential amplifiers except the Nth differential amplifier is connected to an (i+2)th sensing line,
   wherein in a first time of the reverse sensing mode, the inverting input terminal of each of the other differential amplifiers except the Nth differential amplifier is connected to the (i+1)th sensing line, and the non-inverting input terminal of each of the other differential amplifiers except the Nth differential amplifier is connected to the ith sensing line,
   wherein in a second time of the reverse sensing mode, the inverting input terminal of each of the other differential amplifiers except the Nth differential amplifier is connected to the (i+2)th sensing line, and the non-inverting input terminal of each of the other differential amplifiers except the Nth differential amplifier is connected to the (i+1)th sensing line,
   wherein in the first time of the forward sensing mode, an inverting input terminal of the Nth differential amplifier is connected to an (N-1)th sensing line, and a non-inverting input terminal of the Nth differential amplifier is connected to an Nth sensing line,
   wherein in the second time of the forward sensing mode, the inverting input terminal of the Nth differential amplifier is connected to the Nth sensing line, and the non-inverting input terminal of the Nth differential amplifier is not connected to any sensing line,
   wherein in the first time of the reverse sensing mode, the inverting input terminal of the Nth differential amplifier is connected to the Nth sensing line, and the non-inverting input terminal of the Nth differential amplifier is connected to the (N-1)th sensing line,
   wherein in the second time of the reverse sensing mode, the inverting input terminal of the Nth differential amplifier is not connected to any sensing line, and the non-inverting input terminal of the Nth differential amplifier is connected to the Nth sensing line.

9. The touch sensing system of claim 8, wherein the touch sensing IC ignores an output of the Nth differential amplifier and calculates coordinates of a position of the touch input based on sensing results obtained by combining touch raw data obtained from an output of the other differential amplifiers based on the number of channels.

10. The touch sensing system of claim 7, wherein each differential amplifier includes an inverting input terminal, a non-inverting input terminal, an output terminal, and a capacitor connected between the inverting input terminal and the output terminal,
   wherein the inverting input terminal and the non-inverting input terminal of each of other differential amplifiers except a first differential amplifier connected to a first receiving channel of the touch sensing IC among the differential amplifiers are connected to adjacent sensing lines, and one input terminal of the first differential amplifier is not connected to any sensing line.

11. The touch sensing system of claim 10, wherein in a first time of the forward sensing mode, the inverting input terminal of each of the other differential amplifiers except the first differential amplifier is connected to an ith sensing line, and the non-inverting input terminal of each of the other differential amplifiers except the first differential amplifier is connected to an (i+1)th sensing line, where 'i' is a positive integer,
   wherein in a second time of the forward sensing mode, the inverting input terminal of each of the other differential amplifiers except the first differential amplifier is connected to the (i+1)th sensing line, and the non-inverting input terminal of each of the other differential amplifiers except the first differential amplifier is connected to an (i+2)th sensing line,
   wherein in a first time of the reverse sensing mode, the inverting input terminal of each of the other differential amplifiers except the first differential amplifier is connected to the (i+1)th sensing line, and the non-inverting input terminal of each of the other differential amplifiers except the first differential amplifier is connected to the ith sensing line,
   wherein in a second time of the reverse sensing mode, the inverting input terminal of each of the other differential amplifiers except the first differential amplifier is connected to the (i+2)th sensing line, and the non-inverting input terminal of each of the other differential amplifiers except the first differential amplifier is connected to the (i+1)th sensing line,
   wherein in the first time of the forward sensing mode, the inverting input terminal of the first differential amplifier is not connected to any sensing line, and the non-inverting input terminal of the first differential amplifier is connected to a first sensing line,
   wherein in the second time of the forward sensing mode, the inverting input terminal of the first differential amplifier is connected to the first sensing line, and the non-inverting input terminal of the first differential amplifier is connected to a second sensing line, wherein in the first time of the reverse sensing mode, the inverting input terminal of the first differential amplifier is connected to the first sensing line, and the non-inverting input terminal of the first differential amplifier is not connected to any sensing line, wherein in the second time of the reverse sensing mode, the inverting input terminal of the first differential amplifier is connected to the second sensing line, and the non-inverting input terminal of the first differential amplifier is connected to the first sensing line.

12. The touch sensing system of claim 11, wherein the touch sensing IC ignores an output of the first differential amplifier and calculates coordinates of a position of the touch input based on sensing results obtained by combining touch raw data obtained from an output of the other differential amplifiers based on the number of channels.

13. The touch sensing system of claim 2, wherein each differential amplifier includes an inverting input terminal, a non-inverting input terminal, an output terminal, and a capacitor connected between the inverting input terminal and the output terminal, wherein the inverting input terminal and the non-inverting input terminal of each of other differential amplifiers except a first differential amplifier connected to a first channel of the touch sensing IC among the differential amplifiers are connected to adjacent sensing lines, and one input terminal of the first differential amplifier is not connected to any sensing line.

14. The touch sensing system of claim 13, wherein in the forward sensing mode, the inverting input terminal of each of the other differential amplifiers except the first differential amplifier is connected to an ith sensing line, and the non-inverting input terminal of each of the other differential amplifiers except the first differential amplifier is connected to an (i+1)th sensing line, where 'i' is a positive integer, wherein in the reverse sensing mode, the inverting input terminal of each of the other differential amplifiers except the first differential amplifier is connected to the (i+1)th sensing line, and the non-inverting input terminal of each of the other differential amplifiers except the first differential amplifier is connected to the ith sensing line, wherein in the forward sensing mode, the inverting input terminal of the first differential amplifier is not connected to any sensing line, and the non-inverting input terminal of the first differential amplifier is connected to a first sensing line, wherein in the reverse sensing mode, the inverting input terminal of the first differential amplifier is connected to the first sensing line, and the non-inverting input terminal of the first differential amplifier is not connected to any sensing line.

15. The touch sensing system of claim 14, wherein the touch sensing IC ignores an output of the first differential amplifier and calculates coordinates of a position of the touch input based on sensing results obtained by combining touch raw data obtained from an output of the other differential amplifiers based on the number of channels.

16. The touch sensing system of claim 1, wherein one frame period is time-divided into a plurality of pixel driving periods and a plurality of touch sensing periods, wherein in the touch sensing periods, the touch sensing IC is driven, receives the output of the differential amplifiers, and converts the output of the differential amplifiers into the touch raw data.

17. The touch sensing system of claim 1, wherein one frame period is time-divided into a plurality of pixel driving periods and a plurality of touch sensing periods, wherein the touch sensing IC is driven and receives the output of the differential amplifiers in the touch sensing periods, wherein the touch sensing IC converts the output of the differential amplifiers into the touch raw data in the pixel driving periods.

* * * * *